United States Patent
Ikeda et al.

(10) Patent No.: US 12,535,828 B2
(45) Date of Patent: Jan. 27, 2026

(54) SYSTEM AND SERVER

(71) Applicant: TOYOTA JIDOSHA KABUSHIKI KAISHA, Toyota (JP)

(72) Inventors: Keigo Ikeda, Nisshin (JP); Daiki Yokoyama, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 84 days.

(21) Appl. No.: 18/611,200

(22) Filed: Mar. 20, 2024

(65) Prior Publication Data

US 2024/0329650 A1 Oct. 3, 2024

(30) Foreign Application Priority Data

Mar. 27, 2023 (JP) ................. 2023-049337

(51) Int. Cl.
*G05D 1/22* (2024.01)
*G05D 1/227* (2024.01)
*G05D 109/10* (2024.01)

(52) U.S. Cl.
CPC ........ *G05D 1/2272* (2024.01); *G05D 2109/10* (2024.01)

(58) Field of Classification Search
CPC ............. G05D 1/2272; G05D 2109/10; G05D 1/2248; G05D 1/227; G05D 2107/70; G05B 2219/14119; G05B 2219/2637; G05B 2219/31006; G05B 2219/50393; G05B 19/4189; G06Q 10/08
See application file for complete search history.

(56) References Cited

U.S. PATENT DOCUMENTS

2017/0320529 A1  11/2017  Nordbruch
2023/0017144 A1*  1/2023  Emacha ............. B25J 11/008

FOREIGN PATENT DOCUMENTS

JP  2017-538619 A  12/2017

\* cited by examiner

*Primary Examiner* — Rodney A Butler
(74) *Attorney, Agent, or Firm* — Sughrue Mion, PLLC

(57) ABSTRACT

A system includes: a remote control unit that causes a moving object to move by remote control, the moving object being able to move by the remote control in a manufacturing process in a factory that manufactures the moving object, the moving object including a communication unit and a driving control unit, the communication unit having a communication function, the driving control unit executing driving control of the moving object; a disabling execution unit that selectively executes one of irreversible disabling processing for irreversibly disabling the remote control, and reversible disabling processing for reversibly disabling the remote control; and a disabling instruction unit that determines which one of the irreversible disabling processing and the reversible disabling processing to execute using shipping destination information related to the remote control at a shipping destination to which the moving object after manufacturing is shipped.

8 Claims, 13 Drawing Sheets

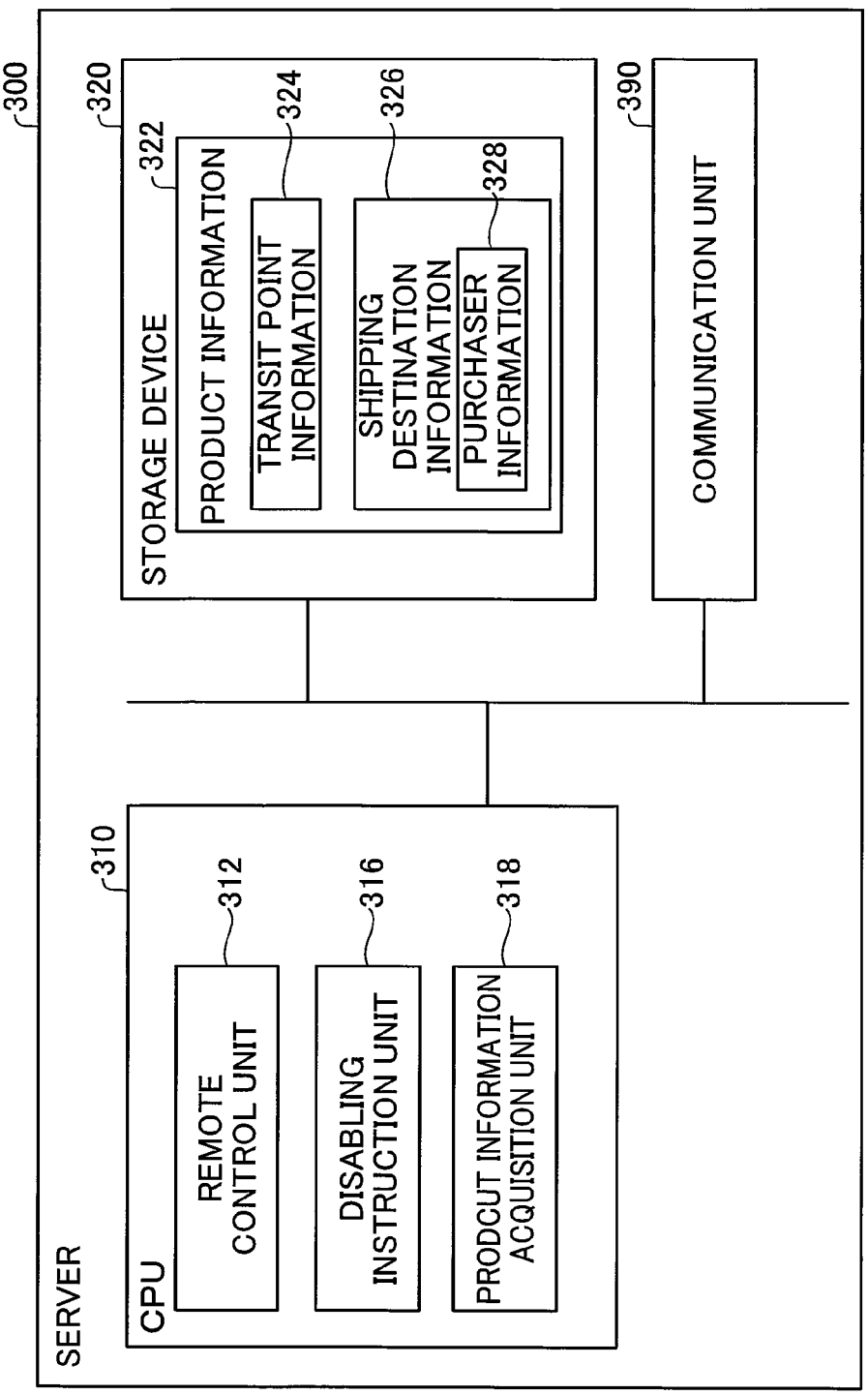

Fig.3

| VEHICLE IDENTIFICATION INFORMATION | TRANSIT POINT INFORMATION | | SHIPPING DESTINATION INFORMATION | | PURCHASER INFORMATION | |
|---|---|---|---|---|---|---|
| | PLACE | WHETHER OR NOT REMOTE CONTROL CAN BE PERFORMED | PLACE | WHETHER OR NOT REMOTE CONTROL CAN BE PERFORMED | EXECUTION OF REMOTE CONTROL | PURCHASER | PURCHASE PURPOSE |
| ID1 | FIRST PORT PT1 | YES | YES | DEALER D1 | YES | YES | CORPORATE BODY C1 | DEMOSTRATION |
| ID2 | SECOND PORT PT2 | YES | YES | DEALER D2 | YES | NO | CORPORATE BODY C2 | SALE |
| ID3 | THIRD PORT PT3 | YES | NO | BUSINESS PLACE B1 | YES | YES | CORPORATE BODY C3 | MOBILITY SERVICE BUSINESS |
| ID4 | NONE | — | — | PRIVATE HOME H1 | NO | — | INDIVIDUAL PE | OFF-THE-JOB |
| ... | ... | ... | ... | ... | ... | ... | ... | ... |

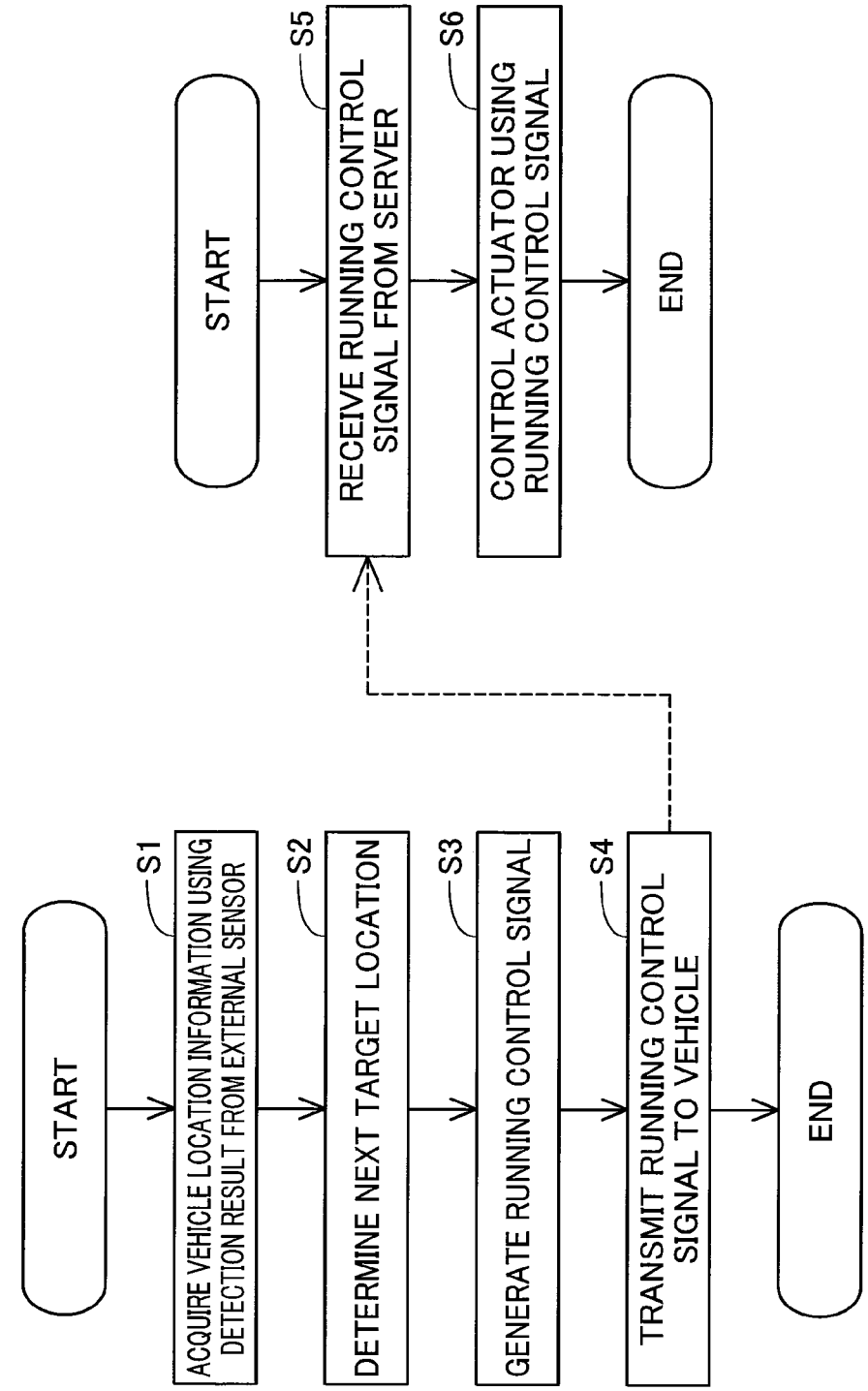

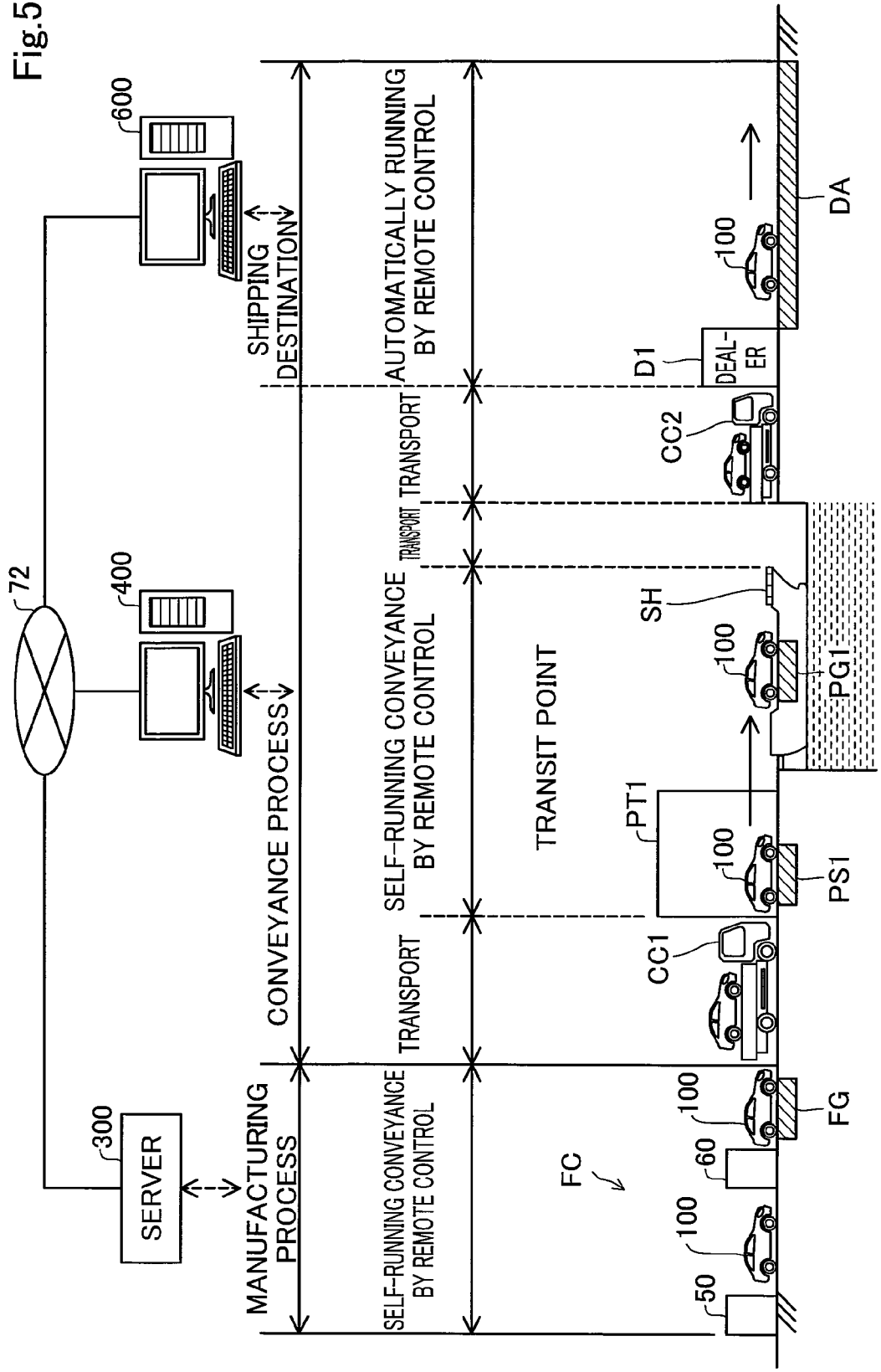

SYSTEM AND SERVER

CROSS REFERENCE TO RELATED APPLICATIONS

This application is based upon and claims benefit of priority from Japanese Patent Application No. 2023-49337, filed on Mar. 27, 2023, the entire contents of which are incorporated herein by reference.

BACKGROUND

Field

The present disclosure relates to a system and a server.

Related Art

For example, Japanese Unexamined Patent Application Publication No. 2017-538619 discloses a vehicle running method for causing a vehicle to run by remote control from an end of an assembly line of a manufacturing system to a parking area of the manufacturing system in the manufacturing system for manufacturing vehicles.

It is studied to irreversibly disable a remote control function at a point of time of shipping of vehicles from factories that manufacture the vehicles. However, there is a demand to park vehicles or load the vehicles to ships at transit points after shipping, or demonstrate automatic driving at shipping destinations, that is, to perform automatic driving by remote control after shipping. Hence, a technique of appropriately disabling remote control in response to the demand after shipping is required.

SUMMARY

The present disclosure can be implemented as a following aspect.

(1) One aspect of the present disclosure provides a system. This system includes a remote control unit that causes a moving object to move by remote control, the moving object being able to move by the remote control in a manufacturing process in a factory that manufactures the moving object, the moving object including a communication unit and a driving control unit, the communication unit having a communication function, the driving control unit executing driving control of the moving object; a disabling execution unit that selectively executes one of irreversible disabling processing for irreversibly disabling the remote control, and reversible disabling processing for reversibly disabling the remote control; and a disabling instruction unit that determines which one of the irreversible disabling processing and the reversible disabling processing to execute using shipping destination information related to the remote control at a shipping destination to which the moving object after manufacturing is shipped.

The system according to this aspect can selectively execute the reversible disabling processing or the irreversible disabling processing of remote control to meet a demand for the remote control at the shipping destination. Consequently, it is possible to perform appropriate disabling processing matching the demand of the shipping destination.

(2) In the system according to the above aspect, the shipping destination information may include information related to whether or not the remote control is able to be executed at the shipping destination. The disabling instruction unit may instruct the disabling execution unit to execute the reversible disabling processing in a case where the shipping destination information indicates that the remote control is able to be executed at the shipping destination, and may instruct the disabling execution unit to execute the irreversible disabling processing in a case where the shipping destination information indicates that the remote control is unable to be executed at the shipping destination.

The system according to this aspect can execute appropriate disabling processing according to whether or not remote control can be executed at the shipping destination.

(3) In the system according to the above aspect, the shipping destination information may include information related to whether or not execution of the remote control is scheduled at the shipping destination. The disabling instruction unit may instruct the disabling execution unit to execute the reversible disabling processing in a case where the shipping destination information indicates that the execution of the remote control is scheduled at the shipping destination, and may instruct the disabling execution unit to execute the irreversible disabling processing in a case where the shipping destination information indicates that the execution of the remote control is not scheduled at the shipping destination.

The system according to this aspect can execute appropriate disabling processing according to whether or not remote control is executed at the shipping destination.

(4) In the system according to the above aspect, the disabling instruction unit may determine which one of the irreversible disabling processing and the reversible disabling processing to execute further using transit point information together with the shipping destination information, the transit point information being related to the remote control in a conveyance process performed outside the factory, the conveyance process shipping the moving object after manufacturing from the factory, and conveying the moving object to the shipping destination.

The system according to this aspect can selectively execute the reversible disabling processing or the irreversible disabling processing of remote control to meet a demand for the remote control at the transit point in addition to the shipping destination. Consequently, it is additionally possible to perform appropriate disabling processing matching the demand of the transit point.

(5) In the system according to the above aspect, the transit point information may include information related to whether or not execution of the remote control is scheduled in the conveyance process. The disabling instruction unit may instruct the disabling execution unit to execute the reversible disabling processing in a case where the transit point information indicates that the execution of the remote control is scheduled in the conveyance process, and may determine using the shipping destination information which one of the irreversible disabling processing and the reversible disabling processing to execute in a case where the transit point information indicates that the execution of the remote control is not scheduled in the conveyance process.

The system according to this aspect can execute appropriate disabling processing according to whether or not remote control is executed in the conveyance process at the time of shipping.

(6) In the system according to the above aspect, the transit point information may include information related to whether or not execution of the remote control is scheduled in the conveyance process. The disabling instruction unit may instruct the disabling execution unit to execute the reversible disabling processing in the conveyance process in a case where the transit point information indicates that the execution of the remote control is scheduled in the conveyance process, and the shipping destination information indicates that the execution of the remote control is scheduled at the shipping destination, and may instruct the disabling execution unit to execute the irreversible disabling processing in the conveyance process in a case where the transit point information indicates that the execution of the remote control is scheduled in the conveyance process, and the shipping destination information indicates that the execution of the remote control is not scheduled at the shipping destination. The disabling instruction unit may determine using the shipping destination information which one of the irreversible disabling processing and the reversible disabling processing to execute in a case where the transit point information indicates that the execution of the remote control is not scheduled in the conveyance process.

The system according to this aspect can execute appropriate disabling processing at the transit point according to whether or not remote control is executed at the shipping destination.

(7) In the system according to the above aspect, the shipping destination information may include purchaser information including information indicating whether or not a purchaser of the moving object is a corporate body. The disabling instruction unit may instruct the disabling execution unit to execute the reversible disabling processing in a case where the purchaser information indicates that the purchaser of the moving object is the corporate body, and instructs the disabling execution unit to execute the irreversible disabling processing in a case where the purchaser information indicates that the purchaser of the moving object is not the corporate body.

The system according to this aspect can estimate on the basis of the purchaser information whether or not remote control is executed at the shipping destination, and execute disabling processing.

(8) Another aspect of the present disclosure provides a server. This server includes: a remote control unit that causes a moving object to move by remote control, the moving object being able to move by the remote control in a manufacturing process in a factory that manufactures the moving object, the moving object including a communication unit, a driving control unit, and a disabling execution unit, the communication unit having a communication function, the driving control unit executing driving control of the moving object, the disabling execution unit selectively executing one of irreversible disabling processing and reversible disabling processing, the irreversible disabling processing being for irreversibly disabling the remote control, the reversible disabling processing being for reversibly disabling the remote control; and a disabling instruction unit that determines which one of the irreversible disabling processing and the reversible disabling processing to execute using shipping destination information related to the remote control at a shipping destination to which the moving object after manufacturing is shipped.

The server according to this aspect can selectively execute the reversible disabling processing or the irreversible disabling processing of remote control to meet a demand for the remote control at the shipping destination. Consequently, it is possible to perform appropriate disabling processing matching the demand of the shipping destination.

The present disclosure can be also implemented by various aspects other than the system and the server. For example, the present disclosure can be implemented by, for example, aspects such as a moving object, a remote control disabling method, a moving object manufacturing method, a moving object control method, a computer program for implementing this moving object control method, and a non-transitory recording medium having this computer program recorded thereon.

BRIEF DESCRIPTION OF THE DRAWINGS

FIG. 2 is a block diagram illustrating an internal functional configuration of a server;

FIG. 3 is an explanatory view illustrating an example of product information;

FIG. 4A is a flowchart illustrating a processing procedure of running control of a vehicle according to the first embodiment;

FIG. 5 is an explanatory view schematically illustrating an outline of remote control of the vehicle from a manufacturing process to a shipping destination;

DETAILED DESCRIPTION

A. First Embodiment

Figure 1:
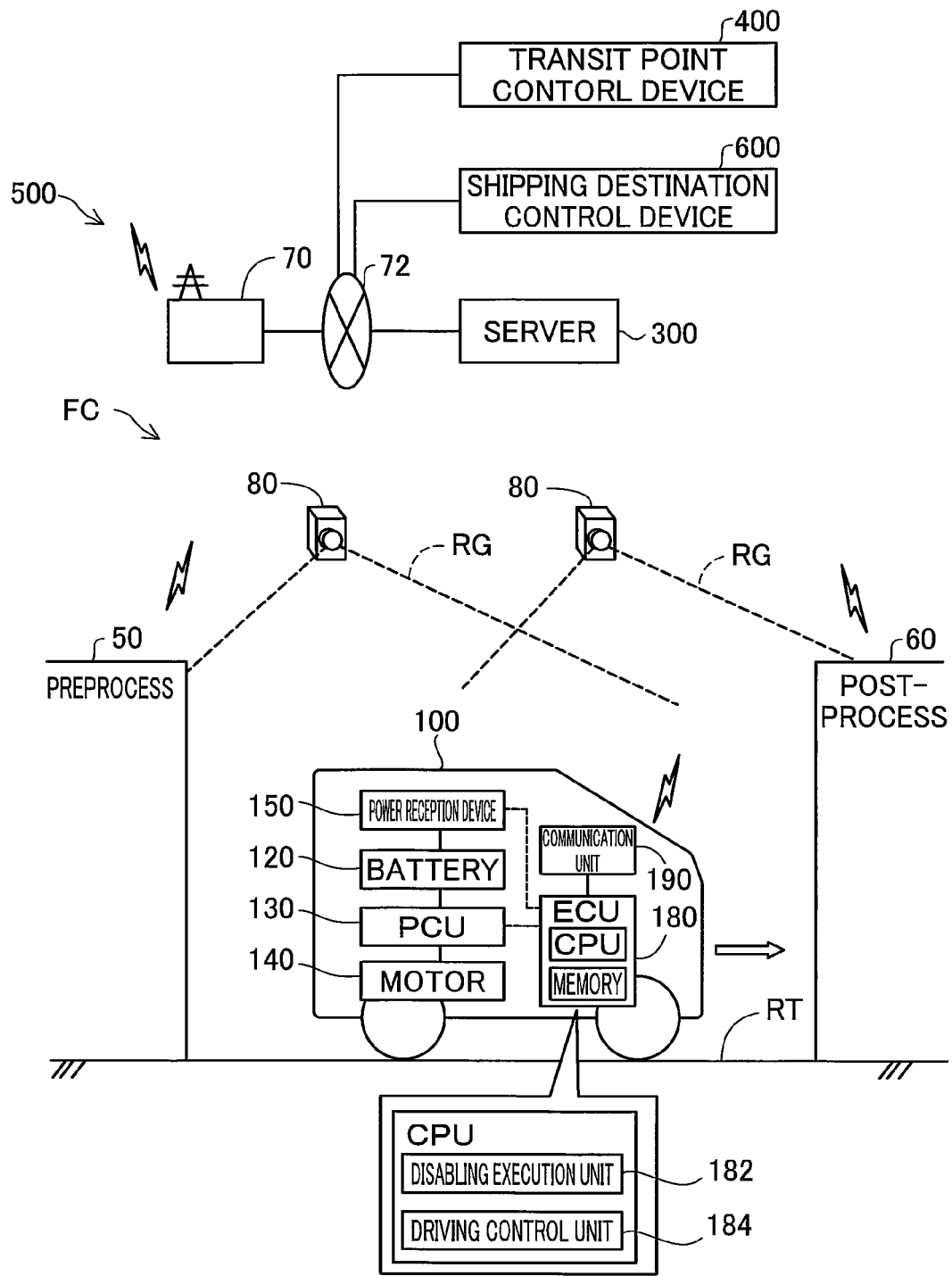
FIG. 1 is an explanatory view illustrating a schematic configuration of a system according to a first embodiment.

FIG. 1 is an explanatory view illustrating a schematic configuration of a system 500 according to the first embodiment. The system 500 controls automatic driving of a vehicle 100 that is a moving object by remote control. The vehicle 100 is, for example, a car, a truck, a bus, a construction vehicle, and the like. The system 500 can cause the vehicle 100 to automatically run by, for example, remote control in a manufacturing process in a factory FC that manufactures the vehicle 100. At a shipping destination of the vehicle 100 such as a dealer of the vehicle 100, the system 500 can cause the vehicle 100 at the shipping destination to automatically run by remote control via a shipping destination control device 600 provided at the shipping destination. Furthermore, in a conveyance process outside the factory FC in which the vehicle 100 manufactured in the manufacturing process is shipped from the factory FC and then arrives at the shipping destination, the system 500 can cause the vehicle 100 at a transit point to automatically run by remote control via a transit point control device 400 provided at the transit point. In this description, a state of a finished product, and a state of a semifinished product/product in process that is being manufactured will be collectively referred to as a "vehicle".

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present embodiment, unmanned driving of the vehicle 100 is implemented by remote control of the vehicle 100. In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

As illustrated in FIG. 1, the factory FC includes a preprocess 50, a post-process 60, and a track RT of the vehicle 100. The track RT is a conveyance zone of the vehicle 100 in the factory FC. The track RT connects the preprocess 50 and the post-process 60. The phrase "in the factory FC" may also include a range all the way to a standby place at which the finished vehicle 100 is loaded for shipping after the vehicle 100 is finished. Each process in the factory FC and the manufacturing process is not limited to a case where each process exists in one building, a case where each process exists at one site or one address, and the like. Each process in the factory FC and the manufacturing process may exist across a plurality of buildings, a plurality of sites, a plurality of addresses, and the like. Furthermore, the sentence "the vehicle 100 runs in the factory FC" is not limited only to a case where the vehicle 100 runs on a track in each process in one factory, and includes a case where the vehicle 100 runs in the conveyance zone between pluralities of factories and processes that exist at a plurality of places. The sentence "the vehicle 100 runs in the factory FC" includes a case where, for example, the vehicle 100 runs on not only a private road but also a public road between factories and between processes to move between the factories and between the processes that exist at plurality of places.

The preprocess 50 is, for example, an assembly process of assembling parts to a vehicle body. The post-process 60 is, for example, an inspection process of the vehicle 100. The vehicle 100 fed from the preprocess 50 is a product in process in the post-process 60, and runs on the track RT to the post-process 60 that is a running destination. When a permission to load the vehicle 100 to the post-process 60 can be obtained, the vehicle 100 is loaded to the post-process 60. The vehicle 100 is finished as a product when the inspection process that is the post-process 60 is finished, the vehicle 100 runs to the standby place in the factory FC to stand by for shipping as described later. Subsequently, the vehicle 100 is shipped to a corresponding destination country per vehicle 100. The "destination country" means a country in which the shipping destination of the vehicle 100 manufactured in the factory FC is located.

Each process in the factory FC including the preprocess 50 and the post-process 60 includes a process management device for managing manufacturing information of the vehicle 100. The "manufacturing information" includes, for example, a progress status of processing in a process, the number of products in process, the number of products during processing, a manufacturing time per process, a start time and a completion time of processing in each process, vehicle identification information of the vehicle 100 that exists in each process, the number of products scheduled to be manufactured in one day, a target manufacturing time of a process for manufacturing the one vehicle 100, and the like. The target manufacturing time is also referred to as a "takt time". The "vehicle identification information" means various pieces of information that make it possible to individually identify the vehicle 100. The vehicle identification information includes, for example, ID information such as a Vehicle Identification Number (VIN) given to each vehicle 100, specification information of the vehicle 100 such as a vehicle type, a color, and a shape, production management information of the vehicle 100 such as a name of a product in process, and the like. The vehicle identification information can be acquired via, for example, narrow band communication or the like from a Radio Frequency-Identification (RF-ID) tag attached to the vehicle 100. The process management device of each process acquires a manufacturing status of the vehicle 100 in each process from an unillustrated camera or sensor provided in each process, and transmits the acquired manufacturing status to a server 300. The manufacturing status of each process may be transmitted to a production management device that integrally manages the manufacturing status of each process of the factory FC. Note that the preprocess 50 and the post-process 60 are not limited to the assembly process and the inspection process, and, as long as the vehicle 100 processed in the preprocess 50 and the post-process 60 can be run by remote control, various processes can be adopted.

The vehicle 100 includes a communication unit 190, a power reception device 150, a battery 120, a PCU 130, a motor 140, and an Electronic Control Unit (ECU) 180. The communication unit 190 is, for example, a wireless communication device that is mounted on the vehicle 100 such as a dongle. The communication unit 190 has a communication function of performing Controller Area Network (CAN) communication that can be used for control of the vehicle 100 or the like, and diagnosis communication that can be used for failure diagnosis and the like. CAN communication is communication standards that make it possible to perform transmission or reception in multiple directions. Diagnosis communication is communication standards that can associate a request and a response on a one-to-one basis. The communication unit 190 performs wireless communication with the server 300 connected to a network 72, the unillustrated production management device that integrally manages production information of the vehicle 100, and devices such as the transit point control device 400 and the shipping destination control device 600 outside the vehicle 100 via, for example, an access point 70 in the factory FC. The communication unit 190 receives a control signal of remote control of the vehicle 100 and a control signal that disables remote control from the server 300, the transit point control device 400, and the shipping destination control device 600.

The power reception device 150 converts alternating current power supplied from an external power feeding device and the like into direct current power by a rectifier to supply to the battery 120 that is a load. The battery 120 is, for example, a chargeable secondary battery such as a lithium ion battery and a nickel-metal hydride battery. The battery 120 is, for example, a high voltage battery of several hundreds of V, and stores electric power used for the vehicle 100 to run. When the electric power supplied from the external power feeding device to the power reception device 150 and regenerative power generated by the motor 140 are supplied to the battery 120, the battery 120 is charged.

The motor 140 is, for example, an alternating current synchronization motor, and functions as an electric motor and an electric generator. When the motor 140 functions as the electric motor, the motor 140 is driven using electric power stored in the battery 120 as a power source. An output of the motor 140 is transmitted to wheels via a decelerator and shafts. At a time of deceleration of the vehicle 100, the motor 140 functions as the electric generator that uses rotation of the wheels, and generates regenerative power. The Power Control Unit (PCU) 130 is electrically connected between the motor 140 and the battery 120.

The PCU 130 includes an inverter, a boost converter, and a DC/DC converter. The inverter converts direct current power supplied from the battery 120 into alternating current power, and supplies the converted alternating current power to the motor 140. The inverter converts the regenerative power supplied from the motor 140 into direct current power to supply to the battery 120. The boost converter boosts the voltage of the battery 120 when the electric power stored in the battery 120 is supplied to the motor 140. The DC/DC converter steps down the voltage of the battery 120 when the electric power stored in the battery 120 is supplied to an accessory or the like.

The ECU 180 is mounted on the vehicle 100, and executes various control of the vehicle 100. The ECU 180 includes a Hard Disk Drive (HDD), a Solid State Drive (SSD), a memory such as an optical recording medium or a semiconductor memory, a CPU that is a central processing unit, and the like. When the CPU executes various computer programs stored in the memory, various functions such as a disabling execution unit 182 and a driving control unit 184 are implemented. The driving control unit 184 executes driving control of the vehicle 100. "Driving control" refers to, for example, adjustment of an acceleration, a speed, and a steering angle. According to driving control by remote control, the driving control unit 184 controls each actuator mounted on the vehicle 100 according to a control signal of the remote control received from the server 300 via the communication unit 190. Furthermore, the ECU 180 controls transmission and reception of electric power between the battery 120 and the motor 140 by controlling the PCU 130.

The disabling execution unit 182 performs disable processing of disabling remote control of the vehicle 100. More specifically, the disabling execution unit 182 receives a disable instruction for requesting the vehicle 100 to disable driving control by remote control from a disabling instruction unit 316 of the server 300 and a transit point disabling instruction unit 416 of the transit point control device 400 by diagnosis communication via the communication unit 190. "Disabling of driving control by remote control" means that a function of executing driving control according to remote control among the functions of the driving control unit 184 is lost. The disabling execution unit 182 that has received the disable instruction transitions to a state where a control request of remote control is disabled. By disabling driving control by remote control, it is possible to prevent a third party from running the vehicle 100 by unauthorized remote control.

Disabling of remote control includes reversible disabling in which remote control that has been disabled can be restored to an enabled state in a case where a predetermined condition is satisfied, and irreversible disabling in which remote control that has been disabled cannot be restored to the enabled state. Reversible disabling can be performed by, for example, encrypting a program of performing a function of executing driving control according to remote control among the functions of the driving control unit 184, and placing the program in a state where the program can be decrypted only by a person who has a predetermined authority. Irreversible disabling can be performed by, for example, a method for deleting the program of performing the function of executing driving control according to remote control, or physically cutting connection with the program, hardware having the function, or the like. In a case where remote control is not executed in future from a viewpoint of security enhancement, it is preferable to perform irreversible disabling. Furthermore, even in a case where remote control is executed in future, it is preferable to perform reversible disabling during a period until remote control is executed. From the viewpoint of security enhancement, the ECU 180 preferably further includes a secure microcomputer on which a Field Programmable Gate Array (FPGA), a flash memory, and the like are mounted, a Hardware Security Module (HSM), and the like. In the following description, disabling processing of performing reversible disabling is also referred to as "reversible disabling processing", and disabling processing of performing irreversible disabling is also referred to as "irreversible disabling processing". The disabling execution unit 182 can selectively execute one of the irreversible disabling processing and the reversible disabling processing according to an instruction of the disabling instruction unit 316 or the transit point disabling instruction unit 416.

The system 500 includes a vehicle detector and the server 300. The vehicle detector detects vehicle information including at least one of an image of the vehicle 100 and the position of the vehicle 100. The detected vehicle information is used for remote control of the system 500. The "vehicle information" may further include a running direction of the vehicle 100 or an orientation of the vehicle 100. The running direction of the vehicle 100 and the orientation of the vehicle 100 can be acquired by, for example, detecting the shape of the vehicle 100, a part of the vehicle 100, or the like. In this regard, the vehicle detector may acquire only the position of the vehicle 100, use a temporal change of the vehicle 100, and thereby estimate the running direction or the orientation of the vehicle 100. The vehicle detector corresponds to an external sensor described later. The vehicle information corresponds to vehicle location information described later.

In the present embodiment, as the vehicle detector, cameras 80 are used. The cameras 80 are fixed to positions at which the cameras 80 can image the track RT and the vehicle 100 that runs on the track RT. The cameras 80 acquire the images of the vehicle 100 as the vehicle information. By performing image analysis on the images acquired by the cameras 80, it is possible to acquire various pieces of vehicle information such as a relative position of the vehicle 100 with respect to the track RT or the orientation of the vehicle 100 that can be used for remote control. By using the images of the cameras 80 installed at the factory FC, it is possible to execute automatic running of the vehicle 100 by remote control without using detectors such as a camera, a millimeter wave radar, a Light Detection and Ranging (LiDAR), and the like mounted on the vehicle 100. In this regard, for a purpose of assistance of collision prevention during remote control or the like, the detectors mounted on the vehicle 100 may be secondarily used. Note that the vehicle detector may not acquire the images of the vehicle 100 as long as the vehicle detector can acquire the position of the vehicle 100. As the vehicle detector, various detectors such as a LiDAR, an infrared sensor, a laser sensor, an ultrasonic sensor, and a millimeter radar that can detect the position of the vehicle 100 can be used.

FIG. 2 is a block diagram illustrating an internal functional configuration of the server 300. The server 300 includes a CPU 310 that is a central processing unit, a storage device 320, and a communication unit 390, and these CPU 310, storage device 320, and communication unit 390 are connected with each other via an internal bus, an interface circuit, and the like. The communication unit 390 is a circuit that communicates with the vehicle 100, the transit point control device 400, the shipping destination control device 600, and the like via the network 72.

The storage device 320 is, for example, a RAM, a ROM, an HDD, an SSD, and the like. In a readable/writable region of the storage device 320, for example, product information 322 acquired in each process or from the production management device is stored. The product information 322 includes transit point information 324 acquired from the transit point control device 400, and shipping destination information 326 acquired from the shipping destination control device 600. The shipping destination information 326 includes purchaser information 328 related to a purchaser of the vehicle 100.

FIG. 3 is an explanatory view illustrating an example of the product information 322. The product information 322 indicates a correspondence between vehicle identification information ID1 to vehicle identification information ID4, the transit point information 324, and the shipping destination information 326. In the example in FIG. 3, the vehicle 100 having the vehicle identification information ID1 is shipped to a dealer D1 via a first port PT1 that is a transit point. The vehicle 100 having the vehicle identification information ID2 is shipped to a dealer D2 via a second port PT2. The vehicle 100 having the vehicle identification information ID3 is shipped to a business place B1 via a third port PT3. The vehicle 100 having the vehicle identification information ID4 is shipped to a private home H1 without going via a transit point. Note that the transit point is not limited to one transit point, and two or more transit points may be set.

As illustrated in FIG. 3, the transit point information 324 and the shipping destination information 326 each indicate information related to remote control at a transit point and a shipping destination. "Whether or not remote control can be performed" indicates, for example, whether or not an infrastructure for remote control is constructed, and indicates whether or not automatic running of the vehicle 100 can be executed by remote control at a transit point and a shipping destination. The infrastructure for remote control is, for example, facilities such as functions of communicating with the vehicle 100 and the vehicle detector that are used for remote control of the vehicle 100, and tracks on which the vehicle 100 can run. "Execution of remote control" indicates whether or not the transit point and the shipping destination are scheduled to execute automatic running of the vehicle 100 by remote control. Note that the transit point information 324 and the shipping destination information 326 may be only one of items "whether or not remote control can be performed" and "execution of remote control". Note that the transit point information 324 and the shipping destination information 326 are sequentially acquired and updated by a transit point information management unit 418 of the transit point control device 400 and a shipping destination information management unit 618 of the shipping destination control device 600, and are acquired by a product information acquisition unit 318 from the transit point control device 400 and the shipping destination control device 600.

In the example in FIG. 3, the transit point information 324 indicates "Yes" as whether or not remote control can be performed and "Yes" as execution of remote control at the first port PT1 and the second port PT2. Consequently, it is possible to execute a self-running conveyance of the vehicle 100 by remote control at the first port PT1 and the second port PT2. At the third port PT3, whether or not remote control can be performed is "Yes", yet execution of remote control is "No". Hence, the self-running conveyance of the vehicle 100 is not executed by remote control at the third port PT3.

The shipping destination information 326 indicates "Yes" as whether or not remote control can be performed, and "Yes" as execution of remote control at the dealer D1 and the business place B1. In the present embodiment, the item "execution of remote control" of the shipping destination information 326 is prioritized over the item "whether or not remote control can be performed". Consequently, it is possible to execute the self-running conveyance of the vehicle 100 by remote control at the dealer D1 and the business place B1. At the dealer D2, whether or not remote control can be performed is "Yes", yet execution of remote control is "No". Furthermore, whether or not remote control can be performed is "No" at the private home H1. Accordingly, the self-running conveyance of the vehicle 100 is not executed by remote control at the dealer D2 and the private home H1.

As illustrated in FIG. 3, the shipping destination information 326 includes the purchaser information 328. The purchaser information 328 includes, for example, information related to whether or not the purchaser of the vehicle 100 is a corporate body. The information included in the purchaser information 328 can be used to determine at the shipping destination whether or not the self-running conveyance of the vehicle 100 is executed by remote control. As illustrated in FIG. 3, the purchaser information 328 may include, for example, information related to a purchase purpose of the vehicle 100. In the example in FIG. 3, the purchaser of the vehicle 100 of the vehicle identification information ID1 is a corporate body C1, and the purchase purpose of the vehicle 100 is demonstration of the self-running conveyance by remote control for clients. A purchaser of the vehicle 100 of the vehicle identification information ID2 is a corporate body C2, and the purchase purpose of the vehicle 100 is sales to clients. A purchaser of the vehicle 100 of the vehicle identification information ID3 is a corporate body C3, and the purchase purpose of the vehicle 100 is use for Mobility as a Service (MaaS). A purchaser of the vehicle 100 of the vehicle identification information ID4 is a person PE, and the purchase purpose of the vehicle 100 is off-the-job. Note that, in a case where whether or not automatic running of the vehicle 100 is executed by remote control is determined on the basis of the item "whether or not remote control can be performed" or "execution of remote control" in the shipping destination information 326, for example, that is, in a case where the purchaser information 328 is not used, the purchaser information 328 may be omitted.

Back to FIG. 2, various programs for implementing functions provided in the present embodiment are stored in the storage device 320 of the server 300. When a computer program stored in the storage device 320 is executed by the CPU 310, the CPU 310 functions as a remote control unit 312, the disabling instruction unit 316, the product information acquisition unit 318, and the like. Part or all of these functions may be configured by hardware circuits. The product information acquisition unit 318 acquires the transit point information 324 and the shipping destination information 326 from the transit point control device 400 and the shipping destination control device 600.

The disabling instruction unit 316 instructs the disabling execution unit 182 of the vehicle 100 in the factory FC to execute disabling processing. When the vehicle 100 is at a transit point, the disabling instruction unit 316 instructs the transit point disabling instruction unit 416 included in the transit point control device 400 to execute disabling processing. In this regard, the transit point disabling instruction unit 416 may cause the disabling execution unit 182 of the vehicle 100 to execute the disabling processing without the instruction from the disabling instruction unit 316.

The disabling instruction unit 316 refers to the shipping destination information 326, and determines which one of irreversible disabling processing and reversible disabling processing to execute at a time of shipping of the vehicle 100. The disabling instruction unit 316 checks the item "whether or not remote control can be performed" of the shipping destination information 326, and instructs the disabling execution unit 182 to execute the reversible disabling processing when remote control can be executed at the shipping destination. Consequently, it is possible to enable remote control at the shipping destination while disabling remote control until arrival at the shipping destination. The disabling instruction unit 316 checks the item "whether or not remote control can be performed" of the shipping destination information 326, and instructs the disabling execution unit 182 to execute the irreversible disabling processing when remote control cannot be executed at the shipping destination. Consequently, it is possible to irreversibly disable remote control after shipping, and further enhance security after shipping.

In the present embodiment, the disabling instruction unit 316 checks the item "execution of remote control" of the shipping destination information 326, and instructs the disabling execution unit 182 to execute the reversible disabling processing irrespectively of a result of the item "execution of remote control" when remote control is executed at the shipping destination. The disabling instruction unit 316 checks the item "execution of remote control" of the shipping destination information 326, and instructs the disabling execution unit 182 to execute the irreversible disabling processing when remote control is not executed at the shipping destination. As described above, in the present embodiment, the disabling instruction unit 316 refers to the item "execution of remote control" of the shipping destination information 326 preferentially over the item "whether or not remote control can be performed". However, in other embodiments, the item "whether or not remote control can be performed" may be referred to preferentially over the item "execution of remote control". Furthermore, both of the item "whether or not remote control can be performed" and the item "execution of remote control" may be referred to. In at least one of, for example, a case where "execution of remote control" is "Yes" and a case where "whether or not remote control can be performed" is "Yes", reversible disabling may be executed. By employing such a configuration, it is possible to ship the vehicle 100 in a state where there is a probability that remote control can be effectively decrypted when there is a probability that remote control is performed at a shipping destination.

The disabling instruction unit 316 may refer to the transit point information 324, and determine which one of the irreversible disabling processing and the reversible disabling processing to execute at the time of shipping of the vehicle 100. The disabling instruction unit 316 checks the item "execution of remote control" of the transit point information 324, and instructs the disabling execution unit 182 to execute the reversible disabling processing when remote control is executed at the transit point. Consequently, it is possible to enable remote control at the transit point while enhancing security from the time of shipping to the transit point. The disabling instruction unit 316 checks the item "execution of remote control" of the transit point information 324, and instructs the disabling execution unit 182 to execute the irreversible disabling processing when remote control is not executed at the transit point. Consequently, it is possible to irreversibly disable remote control after shipping, and further enhance security after shipping. In this regard, in a case where the conveyance process does not go via the transit point or in a case where remote control is not executed at the transit point, for example, the disabling instruction unit 316 may not refer to the transit point information 324. Furthermore, the disabling instruction unit 316 may refer to the item "whether or not remote control can be performed" together with or instead of "execution of remote control" of the transit point information 324.

The disabling instruction unit 316 may determine which one of the irreversible disabling and reversible disabling processing to execute using the transit point information 324 and the shipping destination information 326 in combination. In a case where, for example, remote control is executed at the transit point and remote control is also executed at the shipping destination, the disabling instruction unit 316 instructs the disabling execution unit 182 to execute the reversible disabling processing when remote control is completed at the transit point. Consequently, it is possible to enable remote control at the shipping destination, and enhance security from the transit point to the shipping destination. Furthermore, in a case where remote control is executed at the transit point and remote control is not executed at the shipping destination, the disabling instruction unit 316 instructs the disabling execution unit 182 to execute the irreversible disabling processing when remote control is completed at the transit point. Consequently, it is possible to irreversibly disable remote control at or after the transit point, and further enhance security at or after the transit point.

The remote control unit 312 executes automatic running of the vehicle 100 in the factory FC by remote control. More specifically, the remote control unit 312 transmits a control signal for requesting remote control to the vehicle 100 via the communication unit 390. When the vehicle 100 accepts the request for remote control, the ECU 180 implements driving control according to the control signal, and, as a result, the vehicle 100 automatically runs. By conveying the vehicle 100 using automatic running by remote control, it is possible to suppress or prevent artificial accidents caused when the vehicle 100 runs.

FIG. 4A is a flowchart showing a processing procedure for running control of the vehicle 100 in the first embodiment. In step S1, the server 300 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera 80 that is disposed in the factory and outputs a captured image as detection result. In step S1, the server 300 acquires the vehicle location information using the captured image acquired from the camera 80 as the external sensor.

More specifically, in step S1, the server 300 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the system 500 or outside the system 500. The detection model is stored in advance in a memory of the server 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The server 300 can acquire the orientation of the vehicle 100 through estimation based on the direction of a motion vector of the vehicle 100 detected from change in location of a feature point of the vehicle 100 between frames of the captured images using optical flow process, for example.

In step S2, the server 300 determines a target location to which the vehicle 100 is to move next. In the present embodiment, the target location is expressed by X, Y, and Z coordinates in the global coordinate system. The memory of the server 300 contains a reference route stored in advance as a route along which the vehicle 100 is to run. The route is expressed by a node indicating a departure place, a node indicating a way point, a node indicating a destination, and a link connecting nodes to each other. The server 300 determines the target location to which the vehicle 100 is to move next using the vehicle location information and the reference route. The server 300 determines the target location on the reference route ahead of a current location of the vehicle 100.

In step S3, the server 300 generates a running control signal for causing the vehicle 100 to run toward the determined target location. In the present embodiment, the running control signal includes an acceleration and a steering angle of the vehicle 100 as parameters. The server 300 calculates a running speed of the vehicle 100 from transition of the location of the vehicle 100 and makes comparison between the calculated running speed and a target speed of the vehicle 100 determined in advance. If the running speed is lower than the target speed, the server 300 generally determines an acceleration in such a manner as to accelerate the vehicle 100. If the running speed is higher than the target speed as, the server 300 generally determines an acceleration in such a manner as to decelerate the vehicle 100. If the vehicle 100 is on the reference route, server 300 determines a steering angle and an acceleration in such a manner as to prevent the vehicle 100 from deviating from the reference route. If the vehicle 100 is not on the reference route, in other words, if the vehicle 100 deviates from the reference route, the server 300 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the server 300 transmits the generated running control signal to the vehicle 100. The server 300 repeats the acquisition of vehicle location information, the determination of a target location, the generation of a running control signal, the transmission of the running control signal, and others in a predetermined cycle.

In step S5, the vehicle 100 receives the running control signal transmitted from the server 300. In step S6, the vehicle 100 controls an actuator of the vehicle 100 using the received running control signal, thereby causing the vehicle 100 to run at the acceleration and the steering angle indicated by the running control signal. The vehicle 100 repeats the reception of a running control signal and the control over the actuator in a predetermined cycle. According to the system 500 in the present embodiment, it becomes possible to move the vehicle 100 without using a transport unit such as a crane or a conveyor.

Figure 4B:
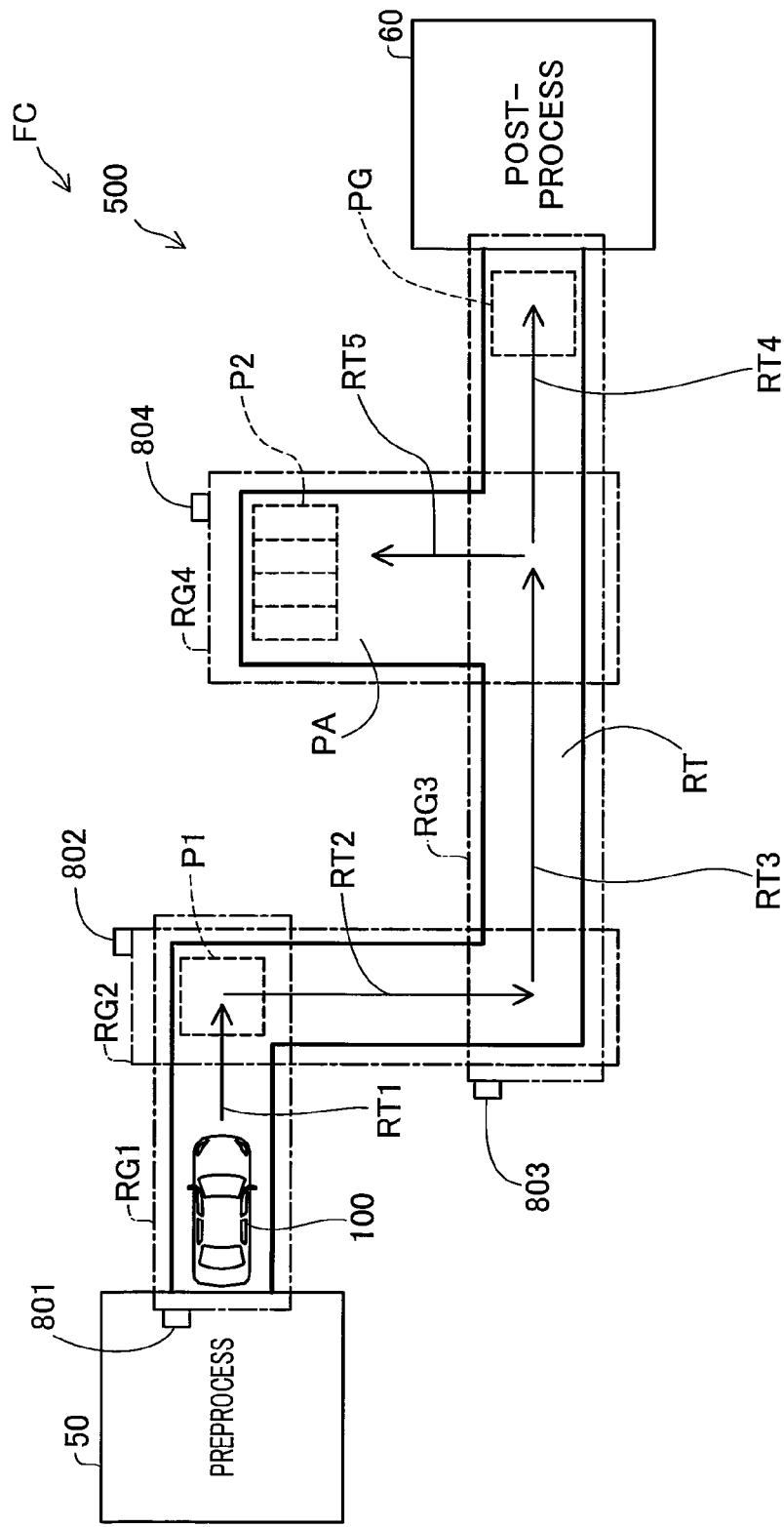
FIG. 4B is an explanatory view illustrating automatic driving control of the vehicle by remote control of a remote control unit.

FIG. 4B is an explanatory view illustrating automatic driving control of the vehicle 100 by remote control of the remote control unit 312. In an example in FIG. 4B, the track RT includes a first track RT1, a second track RT2, a third track RT3, and a fourth track RT4 that continue to each other. The first track RT1 and the second track RT2 are connected to each other via a right-angled curve. A parking area PA is connected between the third track RT3 and the fourth track RT4. The remote control unit 312 causes the vehicle 100 to run to a loading position PG leading to the post-process 60 along the track RT at a normal time.

As illustrated in FIG. 4B, the cameras 80 that are the vehicle detectors acquire images looking down on the vehicle 100 on the track RT and the parking area PA from above. The number of the cameras 80 is set to such a number that entirety of the track RT and the parking area PA can be imaged taking the angles of view of the cameras 80 and the like into account. In the example in FIG. 4B, the cameras 80 include a camera 801 that can image a range RG1 including the entire first track RT1, a camera 802 that can image a range RG2 including the entire second track RT2, a camera 803 that can image a range RG3 including the entire third track RT3 and fourth track RT4, and a camera 804 that can image a range RG4 including the entire parking area PA. Note that the cameras 80 may acquire not only images showing the vehicle 100 from above, but also images showing the vehicle 100 from the front, the back, the sides, and the like. Furthermore, the cameras that acquire these images may be arbitrarily combined.

A virtual target route through which the vehicle 100 needs to run during remote control is set in advance to the track RT. In the present embodiment, the target route corresponds to the above reference route. The remote control unit 312 causes the ECU 180 to execute driving control of the vehicle 100 while analyzing the images of the track RT and the vehicle 100 acquired by the cameras 80 at predetermined time intervals. The remote control unit 312 requests the vehicle 100 to perform remote control of sequentially adjusting the relative position of the vehicle 100 with respect to the target route, so that the vehicle 100 can run along the target route. Note that, for remote control, an image of the entire vehicle 100 may be used, or an image of part of the vehicle 100 such as an alignment mark provided to the vehicle 100 may be used.

At a connection position of each track such as a position P1 illustrated in FIG. 4B, the angles of view of the cameras 80 associated with the respective connected tracks are configured to overlap each other. In the example of the position P1, the angle of view of the camera 801 associated with the first track RT1 and the angle of view of the camera 802 associated with the second track RT2 overlap each other. The vehicle 100 fed from the preprocess 50 runs to the position P1 by remote control that uses captured images of the camera 801. When the vehicle 100 arrives at the position P1, remote control is switched to remote control that uses captured images acquired by the camera 802 instead of the camera 801, and the vehicle 100 runs on the second track RT2. Similarly, captured images acquired by the camera 803 are used for running on the third track RT3 and the fourth track RT4, and captured images acquired by the camera 804 are used for running in the parking area PA. As described above, the remote control unit 312 remotely controls the vehicle 100 while appropriately switching the captured images to analyze per range of the track RT. By performing remote control, the remote control unit 312 can cause the vehicle 100 to run from the track RT to the parking area PA, evacuate from the track RT, and further stop at a parking position P2 in the parking area PA.

FIG. 5 is an explanatory view schematically illustrating an outline of remote control of the vehicle 100 from the manufacturing process to a shipping destination. FIG. 5 illustrates an example where the vehicle 100 of the vehicle identification information ID1 illustrated in FIG. 3 is shipped to the dealer D1 that is the shipping destination. As illustrated in FIG. 5, the "manufacturing process" includes the manufacturing process of the vehicle 100 including the preprocess 50 and the post-process 60 in the factory FC illustrated at the left end in FIG. 5 to a standby place FG at which the finished vehicle 100 stands by to be loaded by a vehicle carrier CC1. The "conveyance process" includes loading of the vehicle 100 to the vehicle carrier CC1 to arrival at the dealer D1 at the right end in FIG. 5. The "shipping destination" includes a use range DA of the vehicle 100 used by the shipping destination such as the dealer D1.

FIG. 5 schematically illustrates a process in which the vehicle 100 is manufactured at the factory FC, and then is shipped to the dealer D1 that is the shipping destination via the first port PT1 that is the transit point. The transit point control device 400 is provided at the transit point. The shipping destination control device 600 is provided at the shipping destination. When the vehicle 100 that has been finished in the factory FC is loaded to the vehicle carrier CC1 at the standby place FG, the process transitions to the conveyance process. The loaded vehicle 100 is transported by the vehicle carrier CC1 to the first port PT1 that is an example of a first transit point. At the first port PT1, the vehicle 100 is moved from a predetermined start position PS1 to a standby position PG1 of a transport ship SH by the self-running conveyance according to remote control via the transit point control device 400, and loaded to the ship. The vehicle 100 loaded to the ship is transported by the transport ship SH, then is loaded to a vehicle carrier CC2, and is transported to the dealer D1. The vehicle 100 unloaded for the dealer D1 is moved to the shipping destination. The vehicle 100 having arrived at the dealer D1 automatically runs within the use range DA that complies with the use purpose of the vehicle 100 used by the dealer D1 by remote control of the shipping destination control device 600 or the like.

Figure 6:
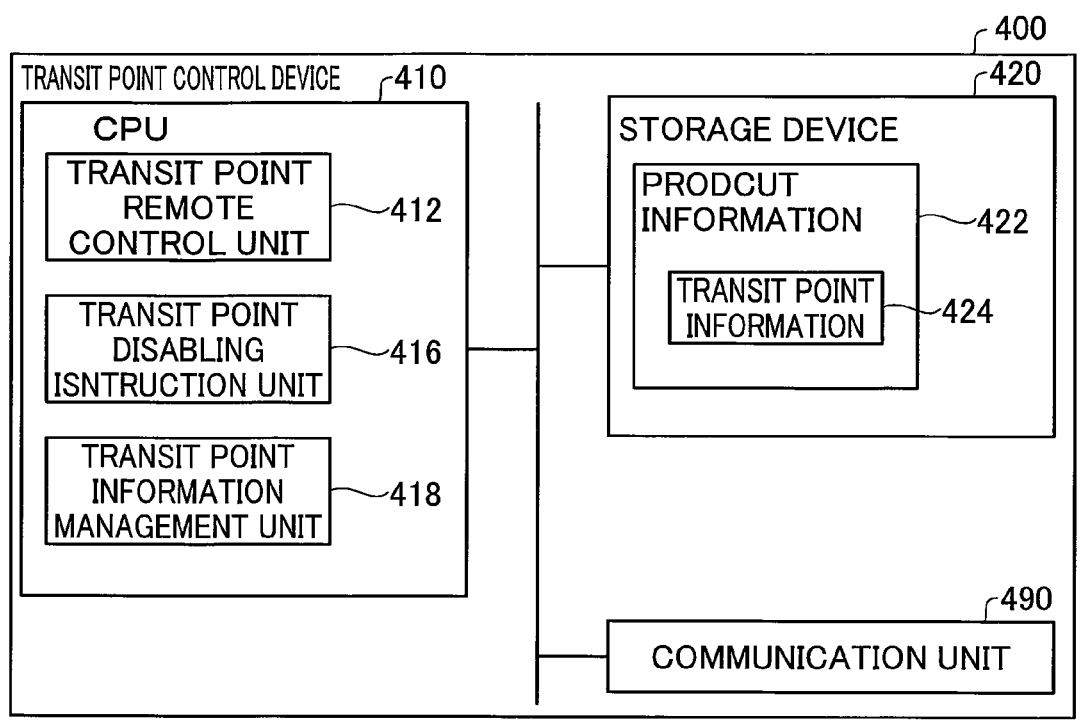
FIG. 6 is a block diagram illustrating an internal functional configuration of a transit point control device.

FIG. 6 is a block diagram illustrating an internal functional configuration of the transit point control device 400. The transit point control device 400 includes a CPU 410 that is a central processing unit, a storage device 420, and a communication unit 490, and these CPU 410, storage device 420, and communication unit 490 are connected with each other via an internal bus, an interface circuit, and the like. The communication unit 490 is a circuit that communicates with the vehicle 100, the server 300, the shipping destination control device 600, and the like via the network 72.

The storage device 420 is, for example, a RAM, a ROM, an HDD, an SSD, and the like. When a computer program stored in the storage device 420 is executed by the CPU 410, the CPU 410 functions as a transit point remote control unit 412, the transit point disabling instruction unit 416, the transit point information management unit 418, and the like. In a readable/writable region of the storage device 420, for example, product information 422 is stored. In the product information 422, transit point information 424 that is substantially the same as the transit point information 324 stored in the server 300 is stored.

The transit point remote control unit 412 has the same function as that of the remote control unit 312, and executes automatic running of the vehicle 100 at a transit point by remote control. The transit point remote control unit 412 transmits a control signal for requesting remote control of the vehicle 100 to the vehicle 100 via the communication unit 490. In the example in FIG. 5, the transit point remote control unit 412 included in the transit point control device 400 at the first port PT1 can cause the vehicle 100 to automatically run at the first port PT1 by remote control. More specifically, the transit point remote control unit 412 executes the self-running conveyance of the vehicle 100 from the start position PS1 of the first port PT1 to the standby position PG1 after ship loading.

The transit point information management unit 418 manages the transit point information 424. The transit point information management unit 418 accepts, for example, automatic update from the transit point control device 400 or a user's input, and updates the transit point information 424. The transit point information management unit 418 shares the transit point information 424 with the server 300. Consequently, it is possible to share the latest transit point information 424 with the server 300.

The transit point disabling instruction unit 416 has the same function as that of the disabling instruction unit 316, and instructs the disabling execution unit 182 of the vehicle 100 at the transit point to execute reversible disabling processing or irreversible disabling processing. In the present embodiment, the transit point disabling instruction unit 416 instructs the vehicle 100 to execute disabling processing according to an instruction from the disabling instruction unit 316 of the server 300.

Figure 7:
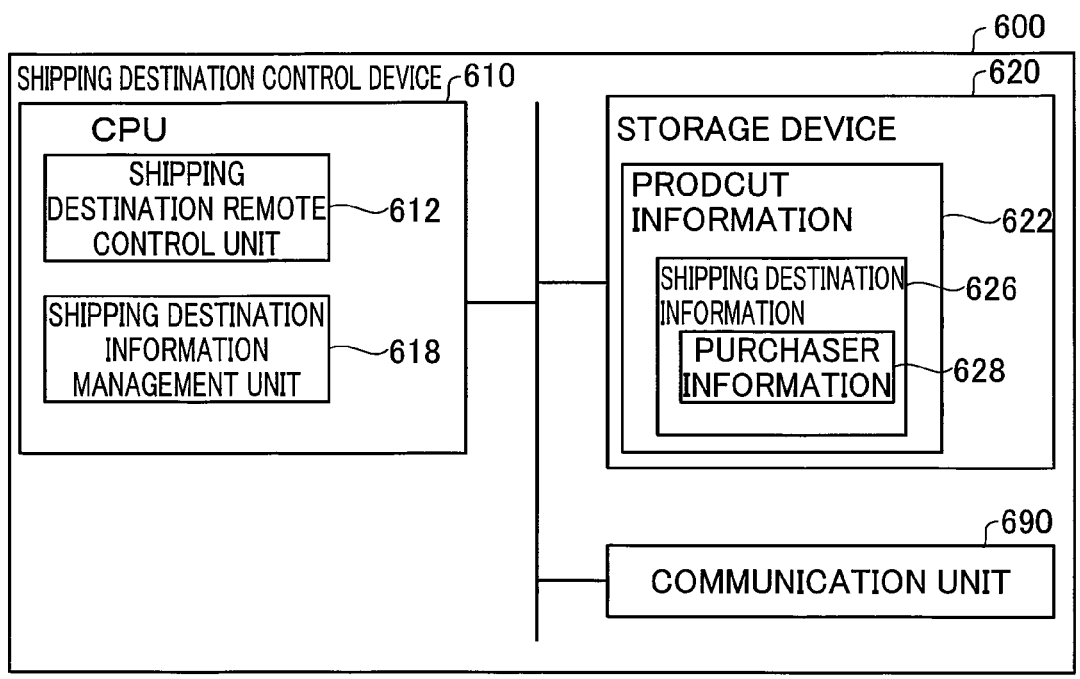
FIG. 7 is a block diagram illustrating an internal functional configuration of a shipping destination control device.

FIG. 7 is a block diagram illustrating an internal functional configuration of the shipping destination control device 600. The shipping destination control device 600 includes a CPU 610 that is a central processing unit, a storage device 620, and a communication unit 690, and these CPU 610, storage device 620, and communication unit 690 are connected with each other via an internal bus, an interface circuit, and the like. The communication unit 690 is a circuit that communicates with the vehicle 100, the server 300, the transit point control device 400, and the like via the network 72.

The storage device 620 is, for example, a RAM, a ROM, an HDD, an SSD, and the like. When a computer program stored in the storage device 620 is executed by the CPU 610, the CPU 610 functions as a shipping destination remote control unit 612, the shipping destination information management unit 618, and the like. In a readable/writable region of the storage device 620, for example, product information 622 is stored. In the product information 622, shipping destination information 626 that is substantially the same as the shipping destination information 326 stored in the server 300 is stored. In the shipping destination information 626, purchaser information 628 that is the substantially same as the purchaser information 328 stored in the server 300 is stored.

The shipping destination remote control unit 612 has the same function as that of the remote control unit 312, and executes automatic running of the vehicle 100 at the shipping destination by remote control. The shipping destination remote control unit 612 transmits a control signal for requesting remote control of the vehicle 100 to the vehicle 100 via the communication unit 690. In the example in FIG. 5, the shipping destination remote control unit 612 included in the shipping destination control device 600 at the dealer D1 can cause the vehicle 100 to automatically run within the use range DA by remote control.

The shipping destination information management unit 618 manages the shipping destination information 626. The shipping destination information management unit 618 accepts, for example, automatic update from the shipping destination control device 600 or a user's input, and updates the shipping destination information 626. The shipping destination information management unit 618 shares the shipping destination information 626 with the server 300. Consequently, it is possible to share the latest shipping destination information 626 with the server 300.

Figure 8:
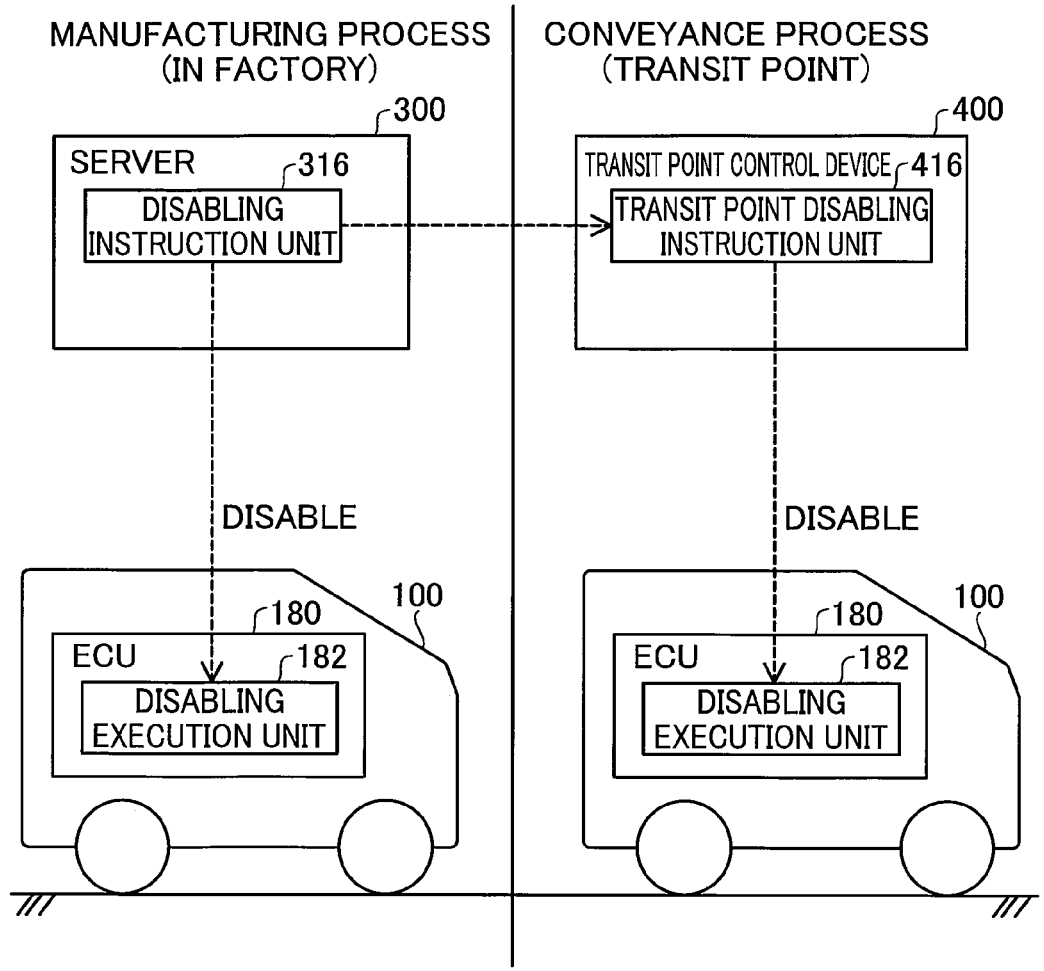
FIG. 8 is an explanatory view schematically illustrating an instructed route of disabling processing.

FIG. 8 is an explanatory view schematically illustrating an instructed route of disabling processing. As illustrated in FIG. 8, in a case where disabling processing of the vehicle 100 in the factory FC is executed, the disabling instruction unit 316 of the server 300 instructs the disabling execution unit 182 of the vehicle 100 to execute the disabling processing by diagnosis communication. The disabling execution unit 182 that has received the disabling request disables a control request for remote control.

In a case where the disabling processing of the vehicle 100 at the transit point is executed, the disabling instruction unit 316 of the server 300 instructs the transit point disabling instruction unit 416 of the transit point control device 400 to execute the disabling processing. The transit point disabling instruction unit 416 instructs the disabling execution unit 182 of the vehicle 100 to execute the disabling processing by diagnosis communication. The disabling execution unit 182 that has received the disabling request disables the control request for remote control.

Figure 9:
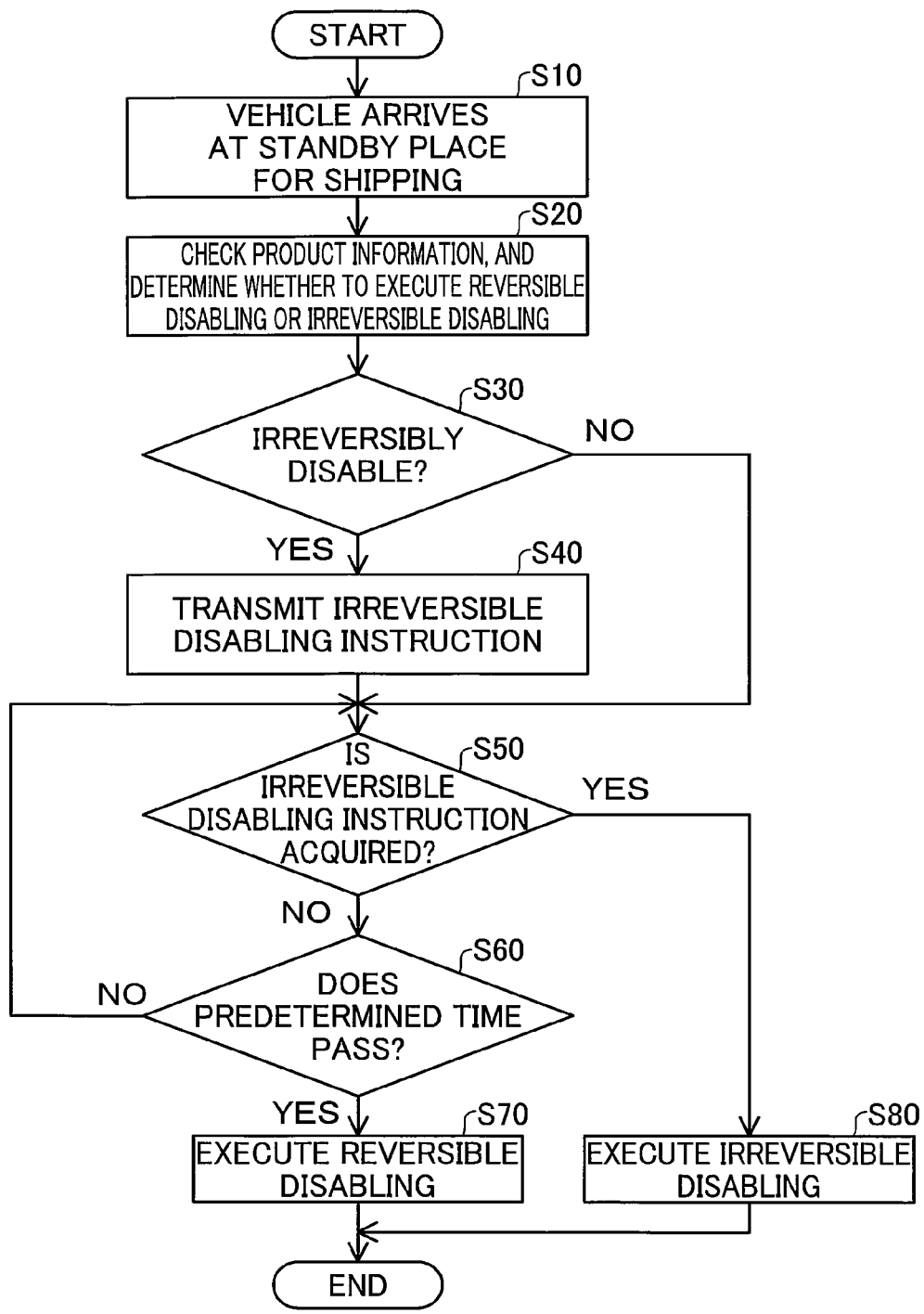
FIG. 9 is a flowchart illustrating a processing routine of the disabling processing in a factory.

FIG. 9 is a flowchart illustrating a processing routine of disabling processing in the factory FC executed by the system 500 according to the present embodiment. This flow is executed at a time of shipping of the vehicle 100 or at a timing near the time of shipping. In the present embodiment, this flow is started by the disabling instruction unit 316 that has accepted a notification indicating completion of processing of the post-process 60 that is an inspection process. This flow may be started when, for example, the disabling instruction unit 316 accepts the notification indicating that the vehicle 100 has arrived at the standby place FG in the factory FC illustrated in FIG. 5.

In step S10, the vehicle 100 that has started running from the post-process 60 by remote control arrives at the standby place FG for shipping in the factory FC. Note that, in a case where the self-running conveyance of the vehicle 100 is not executed from the post-process 60 to the standby place FG by remote control, this flow may be started by, for example, the disabling instruction unit 316 that has accepted the notification indicating completion of processing in the pre-process 50, or may be started at a timing at which all self-running conveyances in the factory FC are completed such as a point of time when the vehicle 100 arrives at the post-process 60 by the self-running conveyance. The vehicle 100 starts timing using an unillustrated timer or the like included in the ECU 180.

In step S20, the disabling instruction unit 316 checks the product information 322, and determines which one of irreversible disabling processing and the reversible disabling processing to execute. More specifically, the disabling instruction unit 316 checks the transit point information 324 of the product information 322 illustrated in FIG. 3, and checks whether or not the vehicle 100 is conveyed via the transit point after shipping. When determining that the vehicle 100 does not go via the transit point, the disabling instruction unit 316 checks the shipping destination information 326. In this case, the disabling instruction unit 316 checks "execution of remote control" of the shipping destination information 326, and instructs the disabling execution unit 182 to execute the reversible disabling processing irrespectively of a result of the item "whether or not remote control can be performed" when remote control is executed at the shipping destination. The disabling instruction unit 316 instructs the disabling execution unit 182 to execute the irreversible disabling processing when remote control is not executed at the shipping destination.

When determining that the vehicle 100 is conveyed via the transit point, the disabling instruction unit 316 checks the transit point information 324, and checks whether or not remote control is executed at the transit point. The disabling instruction unit 316 checks the item "execution of remote control" of the transit point information 324, and, in a case where remote control is not executed at any transit point, the disabling instruction unit 316 checks the shipping destination information 326. Similar to the above, the disabling instruction unit 316 instructs the disabling execution unit 182 to execute the reversible disabling processing or the irreversible disabling processing according to the item "execution of remote control" of the shipping destination information 326. In a case where remote control is executed at any one of transit points, the disabling instruction unit 316 instructs the disabling execution unit 182 to execute the reversible disabling processing.

In step S30, the disabling instruction unit 316 checks a result of determination on whether to execute the irreversible disabling processing or execute the reversible disabling processing. In a case where the reversible disabling processing is executed (S30: NO), the disabling instruction unit 316 moves processing to step S50. In a case where the irreversible disabling processing is executed (S30: YES), the disabling instruction unit 316 moves processing to step S40. In step S40, the disabling instruction unit 316 transmits the control signal for executing the irreversible disabling processing to the vehicle 100 via the communication unit 390.

In step S50, the disabling execution unit 182 stands by for reception of the control signal for executing the irreversible disabling processing from the disabling instruction unit 316. In a case where the control signal is received (S50: YES), the processing is moved to step S80. In step S80, the driving control unit 184 irreversibly disables driving control by remote control, and finishes the processing. Note that an execution result of the irreversible disabling processing may be output from the vehicle 100 to the server 300 or the like.

In a case where the control signal is not received (S50: NO), the disabling execution unit 182 moves the processing to step S60, and stands by for reception of the control signal until a predetermined time passes after timing starts in step S10. In a case where the control signal cannot be received within the predetermined time (S60: YES), the disabling execution unit 182 moves the processing to step S70. In step S70, the driving control unit 184 reversibly disables driving control by remote control, and finishes the processing.

Figure 10:
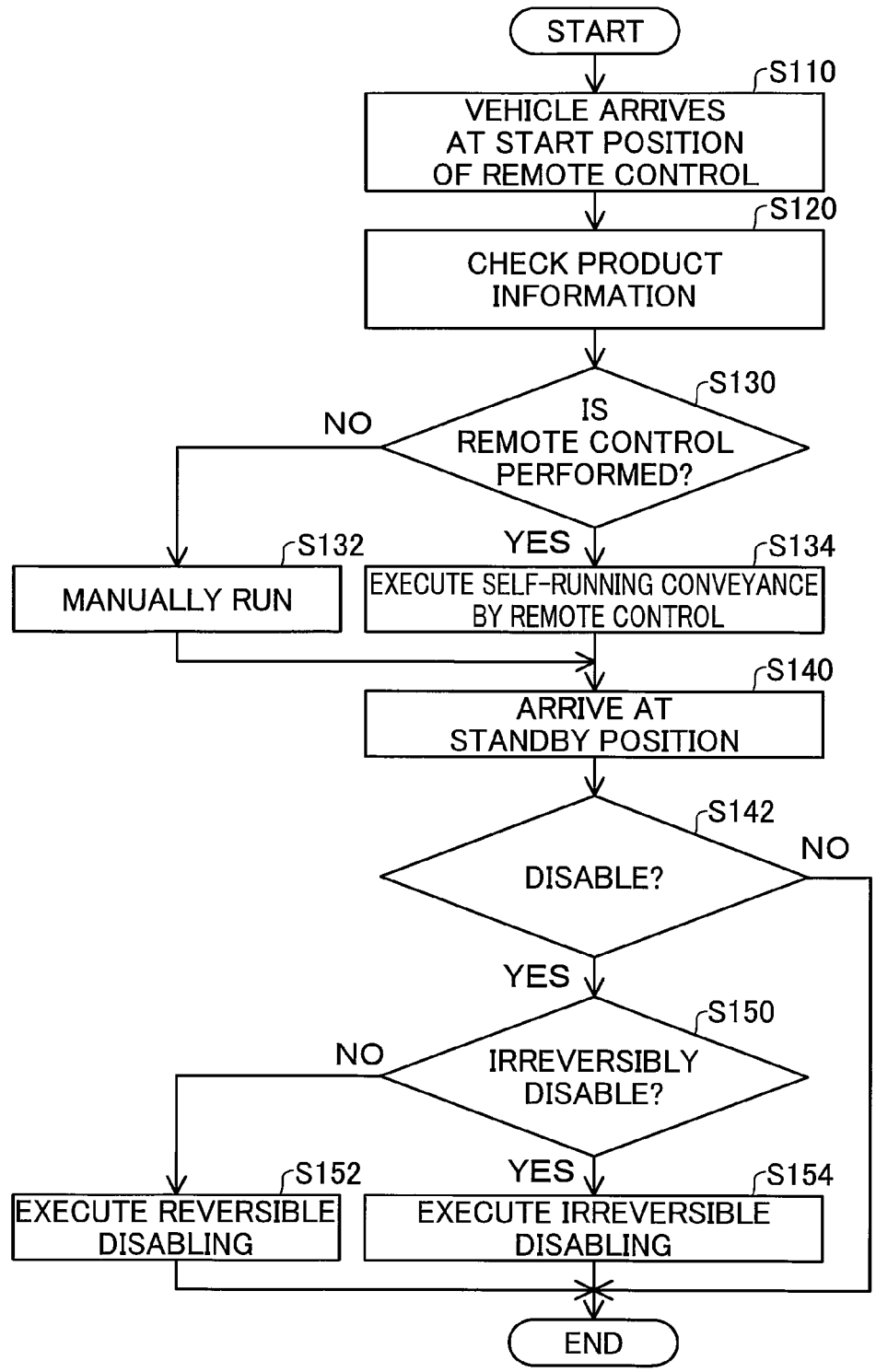
FIG. 10 is a flowchart illustrating the processing routine of the disabling processing at a transit point.

FIG. 10 is a flowchart illustrating a processing routine of disabling processing executed at a transit point by system 500 according to the present embodiment. This flow is started by the disabling instruction unit 316 that has detected that the vehicle 100 has arrived at the transit point. For example, the transit point control device 400 that has acquired vehicle identification information from an RF-ID tag or the like detects the arrival of the vehicle 100 at the transit point by identifying the vehicle 100 that is a processing target. The disabling instruction unit 316 can detect the arrival of the vehicle 100 at the transit point when the arrival is shared from the transit point control device 400. Hereinafter, an example where a vehicle of the vehicle identification information ID1 illustrated in FIG. 5 is shipped to the dealer D1 will be used as appropriate and described. Note that this flow may be executed by the transit point disabling instruction unit 416 instead of the disabling instruction unit 316.

In step S110, the vehicle 100 that is the target of this flow arrives at the start position PS1 of the self-running conveyance by remote control at the first port PT1 that is the transit point. In step S120, the disabling instruction unit 316 checks the product information 322, and checks whether or not the vehicle 100 is the self-running conveyance target of remote control, and whether or not the vehicle 100 is a disabling processing target. In step S130, the disabling instruction unit 316 checks the transit point information 324, and determines whether or not the vehicle 100 is the self-running conveyance target of remote control. The disabling instruction unit 316 determines that the vehicle 100 is the self-running conveyance target in a case where "execution of remote control" is "Yes" in the transit point information 324 illustrated in FIG. 3, and the vehicle 100 is not the self-running conveyance target in a case where "execution of remote control" is "No" in the transit point information 324. In a case where it is determined that the vehicle 100 is determined as the self-running conveyance target of remote control (S130: YES), the disabling instruction unit 316 moves the processing to step S134, and transmits a command for causing the transit point remote control unit 412 to execute remote control. In step S134, the transit point remote control unit 412 executes driving control of the vehicle 100 by remote control, and causes the vehicle 100 to run to the standby position PG1 that is a target value. In a case where the vehicle 100 is not the self-running conveyance target of remote control (S130: NO), the disabling instruction unit 316 moves the processing to step S132. In step S132, the vehicle 100 runs to the standby position PG1 by driving control according to, for example, manual driving of an operator or the like at the transit point. The disabling instruction unit 316 stands by until the transit point remote control unit 412 causes the vehicle 100 to arrive at the standby position PG1.

In step S140, the vehicle 100 arrives at the standby position PG1 for transportation. In step S142, the disabling instruction unit 316 checks the transit point information 324, and checks whether or not to disable remote control of the vehicle 100. For example, in a case where irreversible disabling processing is already executed at the time of shipping, or in a case where reversible disabling is executed at the time of shipping, yet remote control is not executed at the transit point, disabling processing is not executed at the transit point. In a case where the disabling processing is not executed (S142: NO), the disabling instruction unit 316 finishes the processing. In a case where the disabling processing is executed (S142: YES), the disabling instruction unit 316 moves the processing to step S150.

In step S150, the disabling instruction unit 316 checks whether to execute irreversible disabling processing or execute reversible disabling processing. In a case where the reversible disabling processing is executed (S150: NO), the disabling instruction unit 316 moves the processing to step S152. In step S152, the disabling instruction unit 316 transmits a control signal for executing the reversible disabling processing to the transit point disabling instruction unit 416 via the communication unit 390. The transit point disabling instruction unit 416 that has received the control signal transmits to the vehicle 100 the control signal for executing the reversible disabling processing, and finishes the processing. As a result, the driving control unit 184 reversibly disables driving control by remote control. In a case where the irreversible disabling processing is executed (S150: YES), the disabling instruction unit 316 moves the processing to step S154. In step S154, the disabling instruction unit 316 transmits the control signal for executing the irreversible disabling processing to the transit point disabling instruction unit 416 via the communication unit 390. The transit point disabling instruction unit 416 that has received the control signal transmits to the vehicle 100 the control signal for executing the irreversible disabling processing, and finishes the processing. As a result, the driving control unit 184 irreversibly disables driving control by remote control. Note that the processing from step S150 to step S154 may be executed according to the same procedure as that from step S30 to step S80 described above.

As described above, the system 500 according to the present embodiment includes the remote control unit 312 that causes the vehicle 100 to run by remote control, the disabling execution unit 182 that executes irreversible disabling processing for irreversibly disabling remote control and reversible disable processing for reversibly disabling remote control, and the disabling instruction unit 316 that determines which one of the irreversible disabling processing and the reversible disabling processing to execute using the shipping destination information 326 related to remote control at the shipping destination. For example, it is possible to execute the reversible disabling processing when remote control is executed at the shipping destination, or execute the irreversible disabling processing in a case where remote control is not executed at the shipping destination, that is, it is possible to selectively execute the reversible disabling processing or the irreversible disabling processing of remote control to meet a demand for remote control at the shipping destination. Consequently, the system 500 according to the present embodiment can execute appropriate disabling processing matching the demand of the shipping destination.

According to the system 500 according to the present embodiment, the shipping destination information 326 includes information related to whether or not it is possible to execute remote control at the shipping destination. The disabling instruction unit 316 instructs the disabling execution unit 182 to execute the reversible disabling processing in a case where it is possible to execute remote control at the shipping destination, and instructs the disabling execution unit 182 to execute the irreversible disabling processing in a case where it is impossible to execute remote control at the shipping destination. Consequently, it is possible to execute appropriate disabling processing according to whether or not it is possible to execute remote control at the shipping destination.

According to the system 500 according to the present embodiment, the shipping destination information 326 includes information related to whether or not remote control is executed at the shipping destination. The disabling instruction unit 316 instructs the disabling execution unit 182 to execute the reversible disabling processing in a case where remote control is executed at the shipping destination, and instructs the disabling execution unit 182 to execute the irreversible disabling processing in a case where remote control is not executed at the shipping destination. Consequently, it is possible to execute appropriate disabling processing according to whether or not remote control is executed at the shipping destination.

According to the system 500 according to the present embodiment, the disabling instruction unit 316 determines which one of irreversible disabling processing and reversible disabling processing further using the transit point information 324 related to remote control in the conveyance process together with the shipping destination information 326. For example, it is possible to execute the reversible disabling processing when remote control is executed at the transit point, or execute the irreversible disabling processing in a case where remote control is not executed at the transit point, that is, it is possible to selectively execute the reversible disabling processing or the irreversible disabling processing of remote control to meet a demand for remote control at the transit point in addition to the shipping destination. Consequently, the system 500 according to the present embodiment can execute appropriate disabling processing matching the demand of the transit point.

According to the system 500 according to the present embodiment, the transit point information 324 includes information related to whether or not remote control is executed in the conveyance process. The disabling instruction unit 316 instructs the disabling execution unit 182 to execute reversible disabling processing in a case where remote control is executed in the conveyance process. The disabling instruction unit 316 determines which one of the irreversible disabling processing and the reversible disabling processing to execute using the shipping destination information 326 in a case where remote control is not executed in the conveyance process. Consequently, it is possible to execute appropriate disabling processing at the time of shipping according to whether or not remote control is executed at the transit point in the conveyance process.

According to the system 500 according to the present embodiment, the transit point information 324 includes information related to whether or not remote control is executed in the conveyance process. The disabling instruction unit 316 instructs the disabling execution unit 182 to execute reversible disabling processing in the conveyance process in a case where remote control is executed in the conveyance process and remote control is executed at the shipping destination. The disabling instruction unit 316 instructs the disabling execution unit 182 to execute irreversible disabling processing in the conveyance process in a case where remote control is executed in the conveyance process and remote control is not executed at the shipping destination. Consequently, it is possible to execute appropriate disabling processing at the transit point according to whether or not remote control is executed at the shipping destination.

B. Second Embodiment

Figure 11:
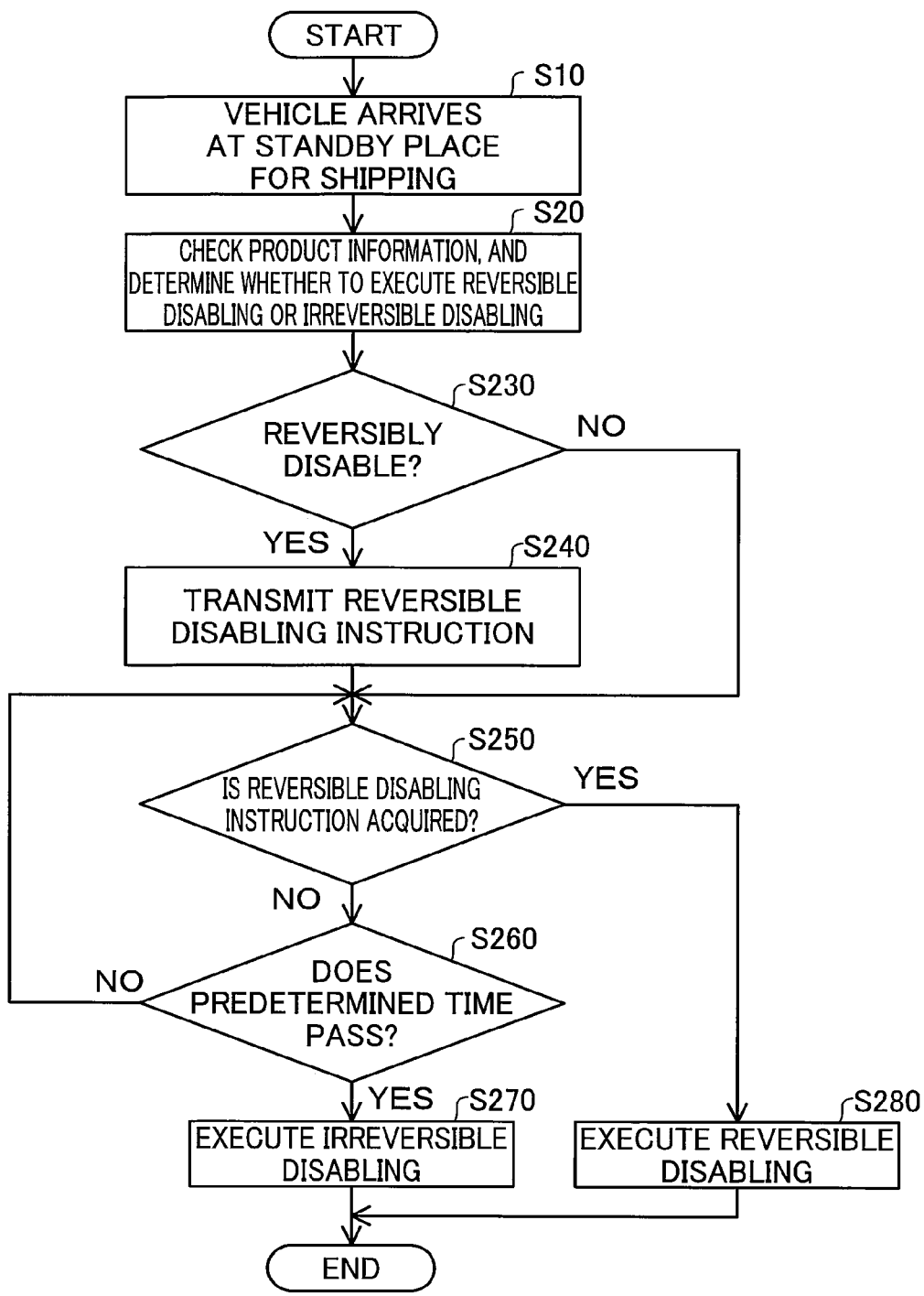
FIG. 11 is a flowchart illustrating the processing routine of the disabling processing in the factory executed by a system according to a second embodiment.

FIG. 11 is a flowchart illustrating a processing routine of disabling processing in the factory FC executed by the system 500 according to the second embodiment. In the present embodiment, although the configuration of the system 500 is the same as that of the first embodiment, the processing routine of the disabling processing is different. The flow in FIG. 11 differs from the flow of the disabling processing according to the first embodiment in FIG. 9 in that the flow in FIG. 11 includes step S230 to step S280 instead of step S30 to step S80. Although the above first embodiment has described the example where the disabling instruction unit 316 generates the control signal for executing the irreversible disabling processing, the present embodiment differs from the above first embodiment in that the disabling instruction unit 316 generates a control signal for executing reversible disabling processing.

In step S230, the disabling instruction unit 316 checks whether to execute irreversible disabling processing or execute reversible disabling processing. In a case where the irreversible disabling processing is executed (S230: NO), the disabling instruction unit 316 moves processing to step S250. In a case where the reversible disabling processing is executed (S230: YES), the disabling instruction unit 316 moves processing to step S240. In step S240, the disabling instruction unit 316 transmits the control signal for executing the irreversible disabling processing to the vehicle 100 via the communication unit 390.

In step S250, the disabling execution unit 182 stands by for reception of the control signal for executing the reversible disabling processing from the disabling instruction unit 316. In a case where the control signal is received (S250: YES), the processing is moved to step S280. In step S280, the driving control unit 184 reversibly disables driving control by remote control.

In a case where the control signal is not received (S250: NO), the disabling execution unit 182 moves the processing to step S260, and stands by for reception of the control signal until a predetermined time passes after timing starts in step S10. In a case where the control signal cannot be received within the predetermined time (S260: YES), the disabling execution unit 182 moves the processing to step S270. In step S270, the disabling instruction unit 316 transmits the control signal for executing the irreversible disabling processing to the vehicle 100 via the communication unit 390, and finishes the processing. As a result, the driving control unit 184 irreversibly disables driving control by remote control, and finishes the processing. The system 500 configured as described above can also obtain the same effect as that in the first embodiment. Furthermore, even in a case where the vehicle 100 cannot receive a control signal due to a failure in communication environment or the like, it is possible to execute irreversible disabling processing. Consequently, it is possible to reliably execute the disabling processing, and suppress or prevent disabling of the vehicle 100 from being delayed due to the failure in the communication environment or the like, and productivity from lowering.

C. Third Embodiment

Figure 12:
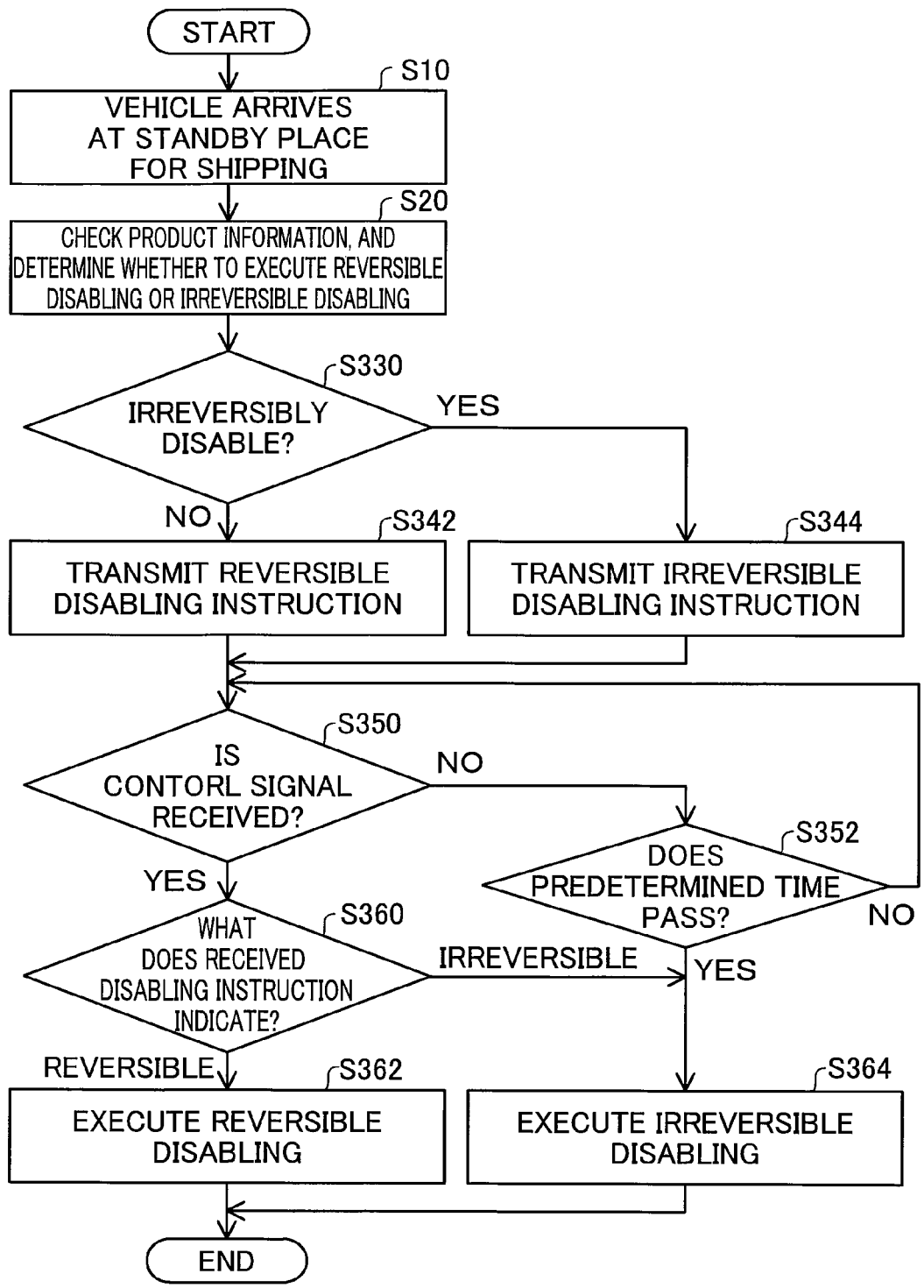
FIG. 12 is a flowchart illustrating the processing routine of the disabling processing in the factory executed by the system according to a third embodiment.

FIG. 12 is a flowchart illustrating a processing routine of disabling processing in the factory FC executed by the system 500 according to the third embodiment. In the present embodiment, although the configuration of the system 500 is the same as that of the first embodiment, the processing routine of the disabling processing is different. The flow in FIG. 12 differs from the flow of the disabling processing according to the first embodiment in FIG. 9 in that the flow in FIG. 12 includes step S330 to step S364 instead of step S30 to step S80. Although the above first embodiment has described the example where the disabling instruction unit 316 generates the control signal for executing the irreversible disabling processing, the present embodiment differs from the above first embodiment in that the disabling instruction unit 316 generates one of a control signal for executing reversible disabling processing and a control signal for executing irreversible disabling processing.

In step S330, the disabling instruction unit 316 checks whether to execute irreversible disabling processing or execute reversible disabling processing. In a case where the irreversible disabling processing is executed (S330: YES), the disabling instruction unit 316 moves processing to step S344. In step S344, the disabling instruction unit 316 transmits the control signal for executing the irreversible disabling processing to the vehicle 100 via the communication unit 390. In a case where the reversible disabling processing is executed (S330: NO), the disabling instruction unit 316 moves processing to step S342. In step S342, the disabling instruction unit 316 transmits the control signal for executing the reversible disabling processing to the vehicle 100 via the communication unit 390.

In step S350, the disabling execution unit 182 stands by for reception of the control signal from the disabling instruction unit 316. In a case where the control signal is not received (S350: NO), the disabling execution unit 182 moves the processing to step S352, and stands by for reception of the control signal until a predetermined time passes after timing starts in step S10 (S352: NO). In a case where the control signal cannot be received within the predetermined time (S352: YES), the disabling execution unit 182 moves the processing to step S364. In step S364, the disabling instruction unit 316 transmits the control signal for executing the irreversible disabling processing to the vehicle 100 via the communication unit 390, and finishes the processing. As a result, the driving control unit 184 irreversibly disables driving control by remote control.

In a case where the control signal is received in step S350 (S350: YES), the disabling instruction unit 316 moves processing to step S360. In step S360, the disabling instruction unit 316 checks whether the received disabling instruction indicates the irreversible disabling processing or the reversible disabling processing. In a case where the received disabling instruction indicates the irreversible disabling processing (S360: irreversible), the processing is moved to step S364. In step S364, the disabling instruction unit 316 transmits the control signal for executing the irreversible disabling processing to the vehicle 100 via the communication unit 390, and finishes the processing. In a case where the received disabling instruction indicates the reversible disabling processing (S360: reversible), the processing is moved to step S362. In step S362, the disabling instruction unit 316 transmits the control signal for executing the reversible disabling processing to the vehicle 100 via the communication unit 390, and finishes the processing. As a result, the driving control unit 184 reversibly disables driving control by remote control. The system 500 configured as described above can also obtain the same effect as that in the first embodiment. Furthermore, even in a case where the vehicle 100 cannot receive a control signal due to a failure in communication environment or the like, it is possible to execute irreversible disabling processing. Consequently, it is possible to suppress or prevent disabling of the vehicle 100 from being delayed due to the failure in the communication environment or the like, and productivity from lowering.

D. Other Embodiment (D1) The above first embodiment has described the example where the disabling instruction unit 316 determines which one of irreversible disabling processing and reversible disabling processing to execute on the basis of a check result of the item "execution of remote control" or the item "whether or not remote control can be performed" of the shipping destination information 326. By contrast with this, the disabling instruction unit 316 may make determination using the purchaser information 328 of the shipping destination information 326. When, for example, determining that remote control is executed at a shipping destination using the purchaser information 328, the disabling instruction unit 316 may instruct the disabling execution unit 182 to execute the reversible disabling processing. The disabling instruction unit 316 can determine whether or not remote control is executed using an item "purchaser" of the purchaser information 328. The disabling instruction unit 316 can determine that remote control is executed when, for example, the purchaser is a corporate body, and instruct execution of the reversible disabling processing, and determine that remote control is not executed when the purchaser is an individual other than the corporate body and instruct execution of the irreversible disabling processing. Furthermore, the disabling instruction unit 316 may determine whether or not remote control is executed at a shipping destination using an item "purchase purpose" of the purchaser of the purchaser information 328. The disabling instruction unit 316 can determine that remote control is executed when "purchase purpose" is, for example, contents related to remote control such as "demonstration for clients" and "mobility service business" and instruct execution of the reversible disabling processing, and determine that remote control is not executed when "purchase purpose" is contents related to remote control such as "sales" and "off-the-job" and instruct execution of the irreversible disabling processing. The system 500 according to this aspect can estimate whether or not remote control is executed at the shipping destination on the basis of the purchaser information, and perform disabling processing.

(D2) The above first embodiment has described the example where the transit point information 324 and the shipping destination information 326 include at least one of the item "whether or not remote control can be performed" and the item "execution of remote control". By contrast with this, the transit point information 324 may not include "whether or not remote control can be performed" and "execution of remote control". The transit point information 324 is not limited only to these pieces of information, and may include various pieces of information related to remote control such as "state" of a transit point or a shipping destination regarding, for example, whether or not the transit point or the shipping destination is under maintenance, and "operation time zone" and "whether or not the transit point control device 400 or the shipping destination control device 600 is included" of a facility related to remote control.

(D3) The above first embodiment has described the example where the transit point control device 400 is included. By contrast with this, in a case where the vehicle 100 is conveyed to the shipping destination without going through the transit point in the conveyance process, the transit point control device 400 may not be included, and the transit point information 324 may not be used in this case. In this case, the disabling instruction unit 316 determines which one of the reversible disabling processing and the irreversible disabling processing to execute using the shipping destination information 326 by the time of shipping in the factory FC.

(D4) Each of the above embodiments has described the example where the disabling instruction unit 316 and the product information acquisition unit 318 are included in the server 300. By contrast with this, all or part of the functions of the disabling instruction unit 316, the product information acquisition unit 318, and the like may be included in devices such as the vehicle 100, the transit point control device 400, and the shipping destination control device 600 other than the server 300. Furthermore, the disabling execution unit 182 may be included not only in the vehicle 100, but also in the transit point control device 400, and the shipping destination control device 600.

(D5) Each of the above embodiments has described the example where the transit point control device 400 includes the transit point disabling instruction unit 416. By contrast with this, the transit point control device 400 may not include the transit point disabling instruction unit 416. In this case, the disabling instruction unit 316 may directly instruct the disabling execution unit 182 of the vehicle 100 at the transit point to execute disabling processing.

(D6) Each of the above embodiments has described the example where the shipping destination control device 600 does not include a shipping destination disabling instruction unit. By contrast with this, the shipping destination control device 600 may include the shipping destination disabling instruction unit. The shipping destination disabling instruction unit instructs the vehicle 100 to perform disabling. In this case, the disabling instruction unit 316 may instruct the shipping destination disabling instruction unit to disable the vehicle 100 at a timing to execute disabling processing at the shipping destination, or may directly instruct the disabling execution unit 182 of the vehicle 100 at the shipping destination to execute the disabling processing.

(D7) The above first embodiment has described the example where, in a case where the disabling instruction unit 316 causes the disabling execution unit 182 to execute one of reversible disabling processing and irreversible disabling processing in the factory FC, disabling processing is started at a point of time at which the vehicle 100 arrives at the standby place FG for shipping or at a timing at which execution of all self-running conveyances in the factory FC has been completed. By contrast with this, the disabling processing is not limited only to the point of time at which the vehicle 100 arrives at the standby place FG for shipping or the timing at which execution of all self-running conveyances in the factory FC has been completed, and may be executed, assuming that automatic running of the vehicle 100 by remote control has been completed, after the point of time at which the vehicle 100 arrives at the standby place FG for shipping or at the timing at which execution of all self-running conveyances in the factory FC has been completed.

(D8) The above first embodiment has described the example where, in a case where the disabling instruction unit 316 causes the disabling execution unit 182 to execute one of reversible disabling processing and irreversible disabling processing at the transit point, disabling processing is started at a point of time at which the vehicle 100 arrives at the standby position PG1 for transportation. By contrast with this, the disabling processing is not limited only to the point of time at which the vehicle 100 arrives at the standby position PG1 for transportation, and may be executed after the point of time at which the vehicle 100 arrives at the standby position PG1 for transportation or at a timing at which execution of all self-running conveyances in the transit point has been completed assuming that execution of automatic running of the vehicle 100 by remote control has been completed.

(D9) In each of the above-described embodiments, the external sensor is not limited to the camera 80 but may be the distance measuring device, for example. The distance measuring device is a light detection and ranging (LiDAR) device, for example. In this case, detection result output from the external sensor may be three-dimensional point cloud data representing the vehicle 100. The server 300 and the vehicle 100 may acquire the vehicle location information through template matching using the three-dimensional point cloud data as the detection result and reference point cloud data, for example.

(D10) In the above-described first embodiment, the server 300 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The server 300 may acquire vehicle location information, determine a target location to which the vehicle 100 is to move next, and generate a route from a current location of the vehicle 100 indicated by the acquired vehicle location information to the target location. The server 300 may generate a route to the target location between the current location and a destination or generate a route to the destination. The server 300 may transmit the generated route to the vehicle 100. The vehicle 100 may generate a running control signal in such a manner as to cause the vehicle 100 to run along the route received from the server 300 and control an actuator using the generated running control signal.

(2) The server 300 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 300 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(D11) In each of the above-described embodiments, the server 300 automatically generates a running control signal to be transmitted to the vehicle 100. By contrast, the server 300 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server 300 through wire communication or wireless communication, for example, and the server 300 may generate a running control signal responsive to the operation on the operating device.

(D12) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(D13) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(D14) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control and its method described in the present disclosure may be implemented by a dedicated computer provided by configuring a processor and memory that are programmed to execute one or more functions embodied by computer programs. Alternatively, the control unit and its method described in the present disclosure may be implemented by a dedicated computer provided by configuring a processor with one or more dedicated hardware logic circuits. Alternatively, the control unit and its method described in the present disclosure may be implemented by one or more dedicated computers configured by a combination of a processor and memory programmed to execute one or more functions and another processor with one or more hardware logic circuits. The computer program may also be stored in a computer-readable non-transitory recording medium as an instruction to be executed by a computer.

The present disclosure is not limited to the above-described embodiments, and can be implemented by various configurations without departing from the gist of the present disclosure. For example, technical features in the embodiments corresponding to technical features in each aspect described in the summary can be replaced or combined as appropriate to solve part or all of the above-described problems or achieve part or all of the above-described effects. Furthermore, the technical features that are not described as indispensable in this description can be deleted as appropriate. For example, the present disclosure may be implemented by aspects described below.

What is claimed is:

1. A system comprising:
a first computer including a first storage unit storing a first program and a first processor; and
a second computer including a second storage unit storing a second program and a second processor, wherein
the first processor executes the first program stored in the first storage unit to:
cause a moving object to move by remote control, the moving object being able to move by the remote control in a manufacturing process in a factory that manufactures the moving object, the moving object including a communication unit and a driving control unit, the communication unit having a communication function, the driving control unit executing driving control of the moving object; and
determine which one of irreversible disabling processing for irreversibly disabling the remote control and reversible disabling processing for reversibly disabling the remote control to execute using shipping destination information related to the remote control at a shipping destination to which the moving object after manufacturing is shipped,
the second processor executes the second program stored in the second storage unit to selectively execute one of:
(i) the irreversible disabling processing and (ii) the reversible disabling processing.

2. The system according to claim 1, wherein
the shipping destination information includes information related to whether or not the remote control is able to be executed at the shipping destination, and
the disabling instruction unit instructs the disabling execution unit to execute the reversible disabling processing in a case where the shipping destination information indicates that the remote control is able to be executed at the shipping destination, and
instructs the disabling execution unit to execute the irreversible disabling processing in a case where the shipping destination information indicates that the remote control is unable to be executed at the shipping destination.

3. The system according to claim 1, wherein
the shipping destination information includes information related to whether or not execution of the remote control is scheduled at the shipping destination, and
the disabling instruction unit instructs the disabling execution unit to execute the reversible disabling processing in a case where the shipping destination information indicates that the execution of the remote control is scheduled at the shipping destination, and
instructs the disabling execution unit to execute the irreversible disabling processing in a case where the shipping destination information indicates that the execution of the remote control is not scheduled at the shipping destination.

4. The system according to claim 1, wherein the disabling instruction unit determines which one of the irreversible disabling processing and the reversible disabling processing to execute further using transit point information together with the shipping destination information, the transit point information being related to the remote control in a conveyance process performed outside the factory, the conveyance process shipping the moving object after manufacturing from the factory, and conveying the moving object to the shipping destination.

5. The system according to claim 4, wherein
the transit point information includes information related to whether or not execution of the remote control is scheduled in the conveyance process, and
the disabling instruction unit instructs the disabling execution unit to execute the reversible disabling processing in a case where the transit point information indicates that the execution of the remote control is scheduled in the conveyance process, and
determines using the shipping destination information which one of the irreversible disabling processing and the reversible disabling processing to execute in a case where the transit point information indicates that the execution of the remote control is not scheduled in the conveyance process.

6. The system according to claim 4, wherein
the transit point information includes information related to whether or not execution of the remote control is scheduled in the conveyance process, and
the disabling instruction unit instructs the disabling execution unit to execute the reversible disabling processing in the conveyance process in a case where the transit point information indicates that the execution of the remote control is scheduled in the conveyance process, and the shipping destination information indicates that the execution of the remote control is scheduled at the shipping destination,
instructs the disabling execution unit to execute the irreversible disabling processing in the conveyance process in a case where the transit point information indicates that the execution of the remote control is scheduled in the conveyance process, and the shipping destination information indicates that the execution of the remote control is not scheduled at the shipping destination, and
determines using the shipping destination information which one of the irreversible disabling processing and the reversible disabling processing to execute in a case where the transit point information indicates that the execution of the remote control is not scheduled in the conveyance process.

7. The system according to claim 1, wherein
the shipping destination information includes purchaser information including information indicating whether or not a purchaser of the moving object is a corporate body, and
the disabling instruction unit instructs the disabling execution unit to execute the reversible disabling processing in a case where the purchaser information indicates that the purchaser of the moving object is the corporate body, and
instructs the disabling execution unit to execute the irreversible disabling processing in a case where the purchaser information indicates that the purchaser of the moving object is not the corporate body.

8. A server comprising:
a first storage unit storing a first program; and
a first processor, wherein
the first processor executes the first program stored in the first storage unit to:
cause a moving object to move by remote control, the moving object being able to move by the remote control in a manufacturing process in a factory that manufactures the moving object, the moving object including a communication unit, a second storage unit storing a second program, and a second processor, the second processor executing the second program stored in the second storage unit to execute driving control of the moving object and to selectively execute one of: (i) irreversible disabling processing and (ii) reversible disabling processing, the irreversible disabling processing being for irreversibly disabling the remote control, the reversible disabling processing being for reversibly disabling the remote control, the communication unit having a communication function; and
a disabling instruction unit that determines which one of the irreversible disabling processing and the reversible disabling processing to execute using shipping destination information related to the remote control at a shipping destination to which the moving object after manufacturing is shipped.

* * * * *